United States Patent
Raghavan et al.

(10) Patent No.: US 12,316,412 B2
(45) Date of Patent: May 27, 2025

(54) ANTENNA GROUP SELECTION AND INDICATION IN FREQUENCY BANDS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/156,763

(22) Filed: Jan. 25, 2021

(65) Prior Publication Data

US 2021/0234586 A1 Jul. 29, 2021

Related U.S. Application Data

(60) Provisional application No. 62/966,488, filed on Jan. 27, 2020.

(51) Int. Cl.
*H04B 7/06* (2006.01)
*H04B 7/0413* (2017.01)

(52) U.S. Cl.
CPC ........... *H04B 7/061* (2013.01); *H04B 7/0617* (2013.01); *H04B 7/0413* (2013.01)

(58) Field of Classification Search
CPC ...... H04B 7/04; H04B 7/0404; H04B 7/0408; H04B 7/0413; H04B 7/0452;
(Continued)

(56) References Cited

U.S. PATENT DOCUMENTS

| | | | |
|---|---|---|---|
| 6,002,360 A | 12/1999 | Wolcott et al. | |
| 7,787,554 B1 * | 8/2010 | Nabar | H04B 7/0874 |
| | | | 375/267 |

(Continued)

FOREIGN PATENT DOCUMENTS

| | | |
|---|---|---|
| CN | 1761182 A | 4/2006 |
| CN | 201902262 U | 7/2011 |

(Continued)

OTHER PUBLICATIONS

Ericsson: "FFSs Regarding Early Measurement Configurations", 3GPP Draft, 3GPP TSG-RAN WG2#106, R2-1907254—FFSS Regarding Early Measurement Configurations, 3rd Generation Partnership Project (3GPP), Mobile Competence Centre, 650, Route Des Lucioles, F-06921 Sophia-Antipolis Cedex, vol. RAN WG2, No. Reno, Nevada, USA, May 13, 2019-May 17, 2019 May 13, 2019 (May 13, 2019), XP051730695, pp. 1-4, Retrieved from the Internet: URL:http://www.3gpp.org/ftp/Meetings%5F3GPP%5FSYNC/RAN2/Docs/R2%2D1907254%2Ezip [retrieved on May 13, 2019] p. 3, paragraph 2.3 p. 4, paragraph 2.4.

(Continued)

*Primary Examiner* — Young T. Tse
(74) *Attorney, Agent, or Firm* — Holland & Hart LLP/QUALCOMM Incorporated

(57) ABSTRACT

Methods, systems, and devices for wireless communications are described in which a first wireless device, such as a user equipment (UE), may select a set of different groups of antenna elements that are preferred for use in millimeter wave communications at the first wireless device. The first wireless device may provide an indication of the set of different groups of antenna elements to a second wireless device, such as a base station. The second wireless device may initiate a beam training based on the set of different groups of antenna elements in order to establish one or more beams to be used for communications using one or more of (Continued)

the different groups of antenna elements that were indicated by the first wireless device.

36 Claims, 17 Drawing Sheets

(58) Field of Classification Search
CPC .... H04B 7/0491; H04B 7/061; H04B 7/0613; H04B 7/0617; H04B 7/0817; H04B 7/082
USPC ........ 375/259, 260, 262, 265, 267; 370/328, 370/334; 455/500, 69, 88
See application file for complete search history.

(56) References Cited

U.S. PATENT DOCUMENTS

| | | | |
|---|---|---|---|
| 7,826,415 B2 | 11/2010 | Oh et al. | |
| 8,503,322 B2 | 8/2013 | Krishnamurthy et al. | |
| 9,312,933 B2 | 4/2016 | Zhang et al. | |
| 9,363,683 B2 | 6/2016 | Raghavan et al. | |
| 9,509,382 B1* | 11/2016 | Nabar | H04B 7/0408 |
| 9,520,973 B2 | 12/2016 | Kim et al. | |
| 9,780,928 B2* | 10/2017 | Moshfeghi | H04B 1/401 |
| 9,806,777 B1* | 10/2017 | Doostnejad | H04B 7/0617 |
| 10,004,032 B2 | 6/2018 | Islam et al. | |
| 10,075,223 B1 | 9/2018 | Pawar et al. | |
| 10,425,878 B2 | 9/2019 | Cezanne et al. | |
| 10,425,901 B2 | 9/2019 | Islam et al. | |
| 10,462,796 B2 | 10/2019 | Frenne et al. | |
| 10,559,880 B1* | 2/2020 | Garrett | H01Q 1/241 |
| 10,574,321 B2 | 2/2020 | Nilsson et al. | |
| 10,826,585 B2 | 11/2020 | Bolotin et al. | |
| 10,841,914 B2 | 11/2020 | Liou et al. | |
| 10,879,627 B1* | 12/2020 | Frigon | H01Q 21/08 |
| 10,924,173 B2 | 2/2021 | Bai et al. | |
| 10,986,235 B2 | 4/2021 | Seo et al. | |
| 11,438,877 B2 | 9/2022 | Luo et al. | |
| 2006/0008275 A1 | 1/2006 | Lacovara et al. | |
| 2006/0039318 A1 | 2/2006 | Oh et al. | |
| 2007/0070927 A1* | 3/2007 | Shoki | H04B 7/0417 370/310 |
| 2008/0240208 A1* | 10/2008 | Lou | H04B 7/0671 375/211 |
| 2011/0069633 A1 | 3/2011 | Schmidt et al. | |
| 2011/0255434 A1 | 10/2011 | Ylitalo | |
| 2012/0015603 A1* | 1/2012 | Proctor, Jr. | H01Q 21/28 455/11.1 |
| 2012/0064841 A1 | 3/2012 | Husted et al. | |
| 2012/0140658 A1 | 6/2012 | Kanzaki et al. | |
| 2014/0011468 A1 | 1/2014 | Park et al. | |
| 2014/0206304 A1* | 7/2014 | Zhang | H04B 7/0617 455/125 |
| 2014/0235287 A1* | 8/2014 | Maltsev | H04B 7/0617 455/522 |
| 2014/0241446 A1 | 8/2014 | Zhang et al. | |
| 2014/0294111 A1* | 10/2014 | Zhang | H04W 52/241 375/267 |
| 2014/0363166 A1 | 12/2014 | Lacovara | |
| 2015/0092621 A1 | 4/2015 | Jalloul et al. | |
| 2015/0349863 A1 | 12/2015 | El Ayach et al. | |
| 2016/0020876 A1 | 1/2016 | Raghavan et al. | |
| 2016/0044517 A1 | 2/2016 | Raghavan et al. | |
| 2016/0112173 A1 | 4/2016 | Wang et al. | |
| 2016/0242182 A1* | 8/2016 | Chen | H04B 7/061 |
| 2017/0005958 A1 | 1/2017 | Frenkel et al. | |
| 2017/0013630 A1 | 1/2017 | Franz et al. | |
| 2017/0117947 A1* | 4/2017 | Petersson | H04B 7/0617 |
| 2017/0164226 A1* | 6/2017 | Wei | H04L 1/0026 |
| 2017/0194706 A1* | 7/2017 | Lee | H04B 7/0619 |
| 2017/0195998 A1 | 7/2017 | Zhang et al. | |
| 2017/0294926 A1 | 10/2017 | Islam et al. | |
| 2017/0359826 A1 | 12/2017 | Islam et al. | |
| 2017/0364819 A1 | 12/2017 | Yang | |
| 2018/0062720 A1 | 3/2018 | Islam et al. | |
| 2018/0063693 A1 | 3/2018 | Chakraborty et al. | |
| 2018/0138962 A1 | 5/2018 | Islam et al. | |
| 2018/0227094 A1 | 8/2018 | Liu et al. | |
| 2018/0227772 A1 | 8/2018 | Yu et al. | |
| 2018/0249453 A1 | 8/2018 | Nagaraja et al. | |
| 2018/0249526 A1 | 8/2018 | Nagaraja et al. | |
| 2018/0278309 A1 | 9/2018 | Raghavan et al. | |
| 2018/0278316 A1* | 9/2018 | Yang | H04B 7/0617 |
| 2018/0278320 A1 | 9/2018 | Chendamarai et al. | |
| 2019/0044596 A1 | 2/2019 | Bolotin et al. | |
| 2019/0053220 A1 | 2/2019 | Zhang et al. | |
| 2019/0059056 A1 | 2/2019 | Islam et al. | |
| 2019/0069198 A1 | 2/2019 | Gheorghiu et al. | |
| 2019/0081691 A1 | 3/2019 | Nagaraja et al. | |
| 2019/0081753 A1 | 3/2019 | Jung et al. | |
| 2019/0103908 A1 | 4/2019 | Yu et al. | |
| 2019/0141552 A1 | 5/2019 | Chen et al. | |
| 2019/0150161 A1 | 5/2019 | Cheng et al. | |
| 2019/0174385 A1 | 6/2019 | Sang et al. | |
| 2019/0190582 A1 | 6/2019 | Guo et al. | |
| 2019/0239092 A1 | 8/2019 | Zhou et al. | |
| 2019/0268118 A1 | 8/2019 | Sadiq et al. | |
| 2019/0349058 A1* | 11/2019 | Raghavan | H04B 7/0874 |
| 2019/0349863 A1 | 11/2019 | Lim et al. | |
| 2019/0393948 A1* | 12/2019 | Zhao | H04B 7/0682 |
| 2020/0015106 A1 | 1/2020 | Lane et al. | |
| 2020/0028545 A1 | 1/2020 | Koskela et al. | |
| 2020/0029274 A1 | 1/2020 | Cheng et al. | |
| 2020/0059280 A1 | 2/2020 | Thurfjell et al. | |
| 2020/0068644 A1 | 2/2020 | Zhou et al. | |
| 2020/0091978 A1 | 3/2020 | Noh et al. | |
| 2020/0136708 A1 | 4/2020 | Pan et al. | |
| 2020/0145079 A1 | 5/2020 | Marinier et al. | |
| 2020/0145929 A1 | 5/2020 | Ryu et al. | |
| 2020/0178134 A1 | 6/2020 | Yang et al. | |
| 2020/0178261 A1 | 6/2020 | Ioffe et al. | |
| 2020/0220603 A1* | 7/2020 | Hao | H04B 7/0617 |
| 2020/0220631 A1 | 7/2020 | Onggosanusi et al. | |
| 2020/0228190 A1 | 7/2020 | Cirik et al. | |
| 2020/0259618 A1 | 8/2020 | Yang et al. | |
| 2020/0259703 A1 | 8/2020 | Cirik et al. | |
| 2020/0260300 A1 | 8/2020 | Cirik et al. | |
| 2020/0314906 A1 | 10/2020 | Goyal et al. | |
| 2020/0351798 A1 | 11/2020 | Ji et al. | |
| 2020/0358509 A1* | 11/2020 | Wernersson | H04L 5/0051 |
| 2020/0366348 A1 | 11/2020 | Bolotin et al. | |
| 2020/0367083 A1* | 11/2020 | Hao | H04W 24/10 |
| 2020/0374806 A1 | 11/2020 | Manolakos et al. | |
| 2020/0374960 A1 | 11/2020 | Deenoo et al. | |
| 2020/0383060 A1 | 12/2020 | Park et al. | |
| 2021/0021325 A1 | 1/2021 | Davydov et al. | |
| 2021/0022094 A1 | 1/2021 | Luo et al. | |
| 2021/0036741 A1 | 2/2021 | Park et al. | |
| 2021/0050898 A1 | 2/2021 | Yu et al. | |
| 2021/0068077 A1* | 3/2021 | Raghavan | H04B 7/0404 |
| 2021/0084672 A1 | 3/2021 | Gulati et al. | |
| 2021/0099958 A1 | 4/2021 | Bae et al. | |
| 2021/0105780 A1 | 4/2021 | Jin et al. | |
| 2021/0105860 A1 | 4/2021 | Tsai et al. | |
| 2021/0111779 A1 | 4/2021 | Kundargi et al. | |
| 2021/0119688 A1 | 4/2021 | Enescu et al. | |
| 2021/0127379 A1 | 4/2021 | Harrebek et al. | |
| 2021/0136598 A1 | 5/2021 | Raghavan et al. | |
| 2021/0144716 A1 | 5/2021 | Choi et al. | |
| 2021/0153085 A1 | 5/2021 | Rahman et al. | |
| 2021/0153209 A1 | 5/2021 | Guan et al. | |
| 2021/0159946 A1* | 5/2021 | Raghavan | H01Q 21/061 |
| 2021/0159966 A1 | 5/2021 | Xi et al. | |
| 2021/0160850 A1 | 5/2021 | Akkarakaran et al. | |
| 2021/0160881 A1 | 5/2021 | Rahman et al. | |
| 2021/0226681 A1 | 7/2021 | Raghavan et al. | |
| 2021/0234593 A1 | 7/2021 | Raghavan et al. | |
| 2021/0234597 A1 | 7/2021 | Raghavan et al. | |
| 2021/0234598 A1 | 7/2021 | Raghavan et al. | |
| 2021/0234602 A1 | 7/2021 | Raghavan et al. | |
| 2021/0234604 A1 | 7/2021 | Raghavan et al. | |
| 2021/0235434 A1 | 7/2021 | Raghavan et al. | |
| 2021/0250940 A1 | 8/2021 | Raghavan et al. | |
| 2021/0251040 A1 | 8/2021 | Tang et al. | |
| 2021/0265741 A1* | 8/2021 | Kenington | H01Q 21/24 |

(56) References Cited

U.S. PATENT DOCUMENTS

| | | | |
|---|---|---|---|
| 2021/0329621 | A1 | 10/2021 | Raghavan |
| 2021/0359826 | A1 | 11/2021 | Wang et al. |
| 2021/0410094 | A1 | 12/2021 | Cui et al. |
| 2022/0006539 | A1 | 1/2022 | Sun et al. |
| 2022/0070823 | A1 | 3/2022 | Ma et al. |
| 2022/0086702 | A1 | 3/2022 | Wang et al. |
| 2022/0149924 | A1 | 5/2022 | Zhang et al. |
| 2022/0150717 | A1 | 5/2022 | Geng et al. |
| 2022/0200146 | A1 | 6/2022 | Du et al. |
| 2022/0201505 | A1 | 6/2022 | Zhao et al. |
| 2022/0210810 | A1 | 6/2022 | Khoshnevisan et al. |
| 2022/0210814 | A1 | 6/2022 | Khoshnevisan |
| 2022/0345908 | A1 | 10/2022 | Takano et al. |
| 2023/0051329 | A1 | 2/2023 | Flordelis et al. |
| 2024/0027821 | A1 | 1/2024 | Noguchi |
| 2024/0129922 | A1 | 4/2024 | Raghavan et al. |

FOREIGN PATENT DOCUMENTS

| | | |
|---|---|---|
| CN | 109391984 A | 2/2019 |
| CN | 109792610 | 4/2019 |
| CN | 110073609 A | 7/2019 |
| CN | 110419177 A | 11/2019 |
| CN | 113287349 A | 8/2021 |
| CN | 113287349 B | 11/2022 |
| EP | 3167653 A1 | 5/2017 |
| EP | 3536101 A1 | 9/2019 |
| JP | 2001526510 A | 12/2001 |
| JP | 2013501480 A | 1/2013 |
| TW | 201902262 A | 1/2019 |
| TW | 201921882 A | 6/2019 |
| TW | 201937873 A | 9/2019 |
| WO | WO-2014130893 A2 | 8/2014 |
| WO | WO-2016005843 A1 | 1/2016 |
| WO | WO-2016148838 | 9/2016 |
| WO | WO-2016148838 A1 | 9/2016 |
| WO | WO-2017007564 A1 | 1/2017 |
| WO | WO-2017204546 A1 | 11/2017 |
| WO | WO-2018075205 A1 | 4/2018 |
| WO | WO-2018085709 A1 | 5/2018 |
| WO | WO-2018128885 A1 | 7/2018 |
| WO | WO-2018144844 A1 | 8/2018 |
| WO | WO-2018219438 A1 | 12/2018 |
| WO | WO-2019014041 A1 | 1/2019 |
| WO | WO-2019029609 A1 | 2/2019 |
| WO | WO-2019140256 A1 | 7/2019 |
| WO | WO-2019192005 A1 | 10/2019 |
| WO | WO-2019213889 A1 | 11/2019 |
| WO | WO-2019231716 A1 | 12/2019 |
| WO | WO-2020020453 A1 | 1/2020 |
| WO | WO-2020096903 A1 | 5/2020 |
| WO | WO-2020101757 A1 | 5/2020 |
| WO | WO-2021041533 A1 | 3/2021 |
| WO | WO-2021144114 A1 | 7/2021 |
| WO | WO-2021154737 A9 | 9/2021 |
| WO | WO-2022170622 A1 | 8/2022 |

OTHER PUBLICATIONS

Huawei et al., "Low Latency of SCell Activation", 3GPP Draft, 3GPP TSG RAN WG1 Meeting #96bis, R1-1903992, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 7, 2019 (Apr. 7, 2019), XP051699403, 6 Pages, Retrieved from the Internet: URL:http://www.3gpp.org/ftp/Meetings%5F3GPP%5FSYNC/RAN1/Docs/R1%2D1903992%2Ezip [retrieved on Apr. 7, 2019] p. 2, paragraph 2.3—p. 3, paragraph 2.4 p. 4, paragraph 3 figures 3-5.
Du, Y., et al., "Evaluation of PMI Feedback Schemes for MU-MIMO Pairing", IEEE Systems Journal, IEEE, US, vol. 4, No. 4, Dec. 1, 2010 (Dec. 1, 2010), XP011320688, pp. 505-510, ISSN: 1932-8184 p. 505.
Huawei, et al., "UL/DL BM for Latency/Overhead Reduction", 3GPP Draft, R1-1903974, 3GPP TSG RAN WG1 #96bis, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699387, 8 Pages, Retrieved from the Internet: URL:http://www.3gpp.org/ftp/Meetings%5F3GPP%5FSYNC/RAN1/Docs/R1%2D1903974%2Ezip [retrieved on Apr. 7, 2019] the Whole Document.
Lenovo, et al., "Discussion of Beam Failure Recovery for Carrier Aggregation", 3GPP Draft, 3GPP TSG RAN WG1 Meeting #92, R1-1804211_BFR, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 6, 2018, XP051413160, 3 Pages, Retrieved from the Internet: URL:http://www.3gpp.org/ftp/tsg%5Fran/WG1%5FRL1/TSGR1%5F92b/Docs/, http://www.3gpp.org/ftp/tsg%5Fran/WG1%5FRL1/TSGR1%5F92b/Docs/, [retrieved on Apr. 6, 2018], p. 1, line 15—line 16 p. 2, line 6—line 16, the Whole Document.
Samsung: "Remaining Details on QCL", 3GPP Draft, 3GPP TSG RAN WG1 #90b, R1-1717634-QCL V2, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340820, 9 Pages, Retrieved from the Internet: URL:http://www.3gpp.org/ftp/Meetings_3GPP_SYNC/RAN1/Docs/ retrieved on Oct. 8, 2017] p. 6—p. 7 p. 3.
Interdigital., et al., "Views on Panel Activation and Deactivation", 3GPP TSG RAN WG1 #98, 3GPP Draft; R1-1908233 Views on Panel Activation and Deactivation, 3rd Generation Partnership Project (3GPP), Mobile Competence Centre, 650, Route Des Lucioles, F-06921 Sophia-Antipolis Cedex, France, vol. RAN WG1, No. Prague, CZ; Aug. 26, 2019-Aug. 30, 2019, Aug. 16, 2019 (Aug. 16, 2019), 6 Pages, XP051764847, Retrieved from the Internet: URL:http://www.3gpp.org/ftp/tsg_ran/WG1_RL1/TSGR1_98/Docs/R1-1908233.zip, [retrieved on Aug. 16, 2019], Section 2, Section 3 (p. 5, gNB-Driven), figures 1-3.
International Search Report and Written Opinion—PCT/US2021/014942—ISA/EPO—dated Jul. 5, 2021.
CATT: "Consideration on Multi-Beam Enhancements", 3GPP Draft; 3GPP TSG RAN WG1 Meeting #98, R1-1908603, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 17, 2019 (Aug. 17, 2019), XP051765211, 7 Pages, Retrieved from the Internet: URL:http://www.3gpp.org/ftp/tsg_ran/WG1_RL1/TSGR1_98/Docs/R1-1908603.zip [retrieved on Aug. 17, 2019], chapter 3; pp. 3,4, p. 2, paragraph section 2.1—p. 3, paragraph section 2.2.
Motorola Mobility, et al., "Power Control for Multi-Panel Uplink Transmission", 3GPP TSG RAN WG1 AH-1901, 3GPP Draft; R1-1900944-PC-EMIMO-Other-Final, 3rd Generation Partnership Project (3GPP), Mobile Competence Centre; 650, Route Des Lucioles; F-06921 Sophia-Antipolis Cedex; France, vol. RAN WG1, No. Taipei; Jan. 21, 2019-Jan. 25, 2019, 4 Pages, Jan. 20, 2019 (Jan. 20, 2019), XP051593788, Retrieved from the Internet: URL:http://www.3gpp.org/ftp/Meetings%5F3GPP%5FSYNC/RAN1/Docs/R1%2D1900944%2Ezip [retrieved on Jan. 20, 2019] p. 2, paragraph section 2.1—p. 3, paragraph section 2.2.
Samsung: "Discussions on NR UL Multi-Panel/Multi-TRP", 3GPP TSG RAN WG1 Meeting #90, 3GPP Draft; R1-1713579 UL Multi TRP Panel V0, 3rd Generation Partnership Project (3GPP), Mobile Competence Centre 650, Route Des Lucioles; F-06921 Sophia-Antipolis Cedex; France, vol. RAN WG1, No. Prague, Czechia; Aug. 21, 2017-Aug. 25, 2017, 3 Pages, Aug. 20, 2017 (Aug. 20, 2017), XP051316379, Retrieved from the Internet: URL:http://www.3gpp.org/ftp/Meetings_3GPP_SYNC/RAN1/Docs/ [retrieved on Aug. 20, 2017] p. 2—p. 3, figure 2.
Fraunhofer IIS, et al., "Discussion on Signaling of Beam Correspondence", 3GPP TSG RAN WG1 Meeting #94bis, 3GPP Draft; R1-1811086 Discussion_on_Signaling_of_Beam_Correspondence, 3rd Generation Partnership Project (3GPP), Mobile Competence Centre; 650, Route Des Lucioles; F-06921 Sophia-Antipolis Cedex,

(56) References Cited

OTHER PUBLICATIONS vol. RAN WG1, No. Chengdu, China; Oct. 8, 2018-Oct. 12, 2018, Sep. 28, 2018 (Sep. 28, 2018), 5 Pages, XP051518487, Retrieved from the Internet: URL:http://www.3gpp.org/ftp/tsg%5Fran/WG1%5FRL1/TSGR1%5F94b/Docs/R1%201811086%2Ezip [retrieved on Sep. 28, 2018], Sections 2-4; Figures 1-3.
Mediatek Inc: "Discussion on UL Beam Management Procedure", 3GPP TSG RAN WG1 Meeting #88, 3GPP Draft; R1-1702731 Discussion on UL Beam Management Procedure Final, 3rd Generation Partnership Project (3GPP), Mobile Competence Centre ; 650, Route Des Lucioles; F-06921 Sophia-Antipolis Cedex, vol. RAN WG1, No. Athens, Greece; Feb. 13, 2017-Feb. 17, 2017, Feb. 12, 2017 (Feb. 12, 2017), XP051209878, 4 Pages, Retrieved from the Internet: URL:http://www.3gpp.org/ftp/Meetings_3GPP_SYNC/RAN1/Docs/ [retrieved on Feb. 12, 2017]. sections 2-4.
Moderator (Samsung): "Moderator Summary for Multi-Beam Enhancement: Proposal Categorization", 3GPP TSG RAN WG1 #102-e, R1-2006985, e-Meeting, Aug. 17, 2020-Aug. 28, 2020, 27 Pages, Aug. 25, 2020 (Aug. 25, 2020) sections 1-2, section 4.1, the whole document.
Raghavan, et al., "Antenna Placement and Performance Tradeoffs With Hand Blockage in Millimeter Wave Systems", IEEE, Apr. 2019 (Year: 2019), 16 Pages.
Ali A., et al., "Spatial Covariance Estimation for Millimeter Wave Hybrid Systems using Out-of-Band Information", May 2019, Center for Transportation Research, pp. 1-14.
Jain I. K., "Millimeter Wave Beam Training: A Survey", arXiv, Sep. 2018, 2 Pages.
Zheng Z., et al., "Time of Arrival and Time Sum of Arrival Based NLOS Identification and Localization", IEEE 2012, 5 Pages.
Nokia, et al., "On CSI-RS Design for DL Beam Management", 3GPP Draft, 3GPP TSG RAN WG1 #88, R1-1703179, Athens, Greece, Feb. 13-17, 2017, 14 Pages, 20170207.
Chen C., "Resolution to CIDs Related to Asymmetric Beamforming and Directional Allocation", IEEE 802.11-18/0158r3, Jan. 15, 2018, pp. 1-8.
Interdigital Inc: "Views on Panel Activation and Deactivation", 3GPP TSG RAN WG1 #98, R1-1908233, Prague, CZ, Aug. 26, 2019-Aug. 30, 2019, 6 Pages.
Fraubhofer Iis., et al., "Discussion on Signaling of Beam Correspondence", R1-1811086, 3GPP TSG RAN WG1 Meeting #94bis Chengdu, China Oct. 8-12, 2018, 5 Pages.
Mediatek Inc: "Discussion on UL Beam Management Procedure", R1-1702731, 3GPP TSG RAN WG1 Meeting #88 Athens, Greece, Feb. 13-17, 2017, 4 Pages.
Apple Inc: "FR2 DL Inter-Band CA Architecture Considerations", 3GPP RAN WG4 Meeting #93, R4-1913540, Reno, USA, Nov. 18-21 2019, 8 Pages, Nov. 9, 2019.
Samsung: "Remaining Details on QCL", 3GPP TSG RAN WG1#90b, R1-1717634, Prague, Czech Republic, Oct. 9-13, 2017, 9 Pages, Oct. 3, 2017, Section 4, 4.2 Intercarrier QCL.

\* cited by examiner

ANTENNA GROUP SELECTION AND INDICATION IN FREQUENCY BANDS

CROSS REFERENCE

The present Application for Patent claims the benefit of U.S. Provisional patent Application No. 62/966,488 by Raghavan et al., entitled "ANTENNA GROUP SELECTION AND INDICATION IN UPPER MILLIMETER WAVE BANDS," filed Jan. 27, 2020, assigned to the assignee hereof, and expressly incorporated by reference in its entirety herein.

INTRODUCTION

The following relates generally to wireless communications and more specifically to managing antenna group selection in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications is described. The method may include transmitting, from a first wireless device to a second wireless device in communications with the first wireless device using a first group of antenna elements, an indication of a set of different groups of antenna elements and one or more attributes of each group in the set of different groups of antenna elements, the one or more attributes including one or more beam characteristics associated with each group, where each group includes one or more antenna elements from one or more of a set of multiple arrays or subarrays of antenna elements. The method may further include receiving, from the second wireless device in response to the indication of the set of different groups of antenna elements, an antenna group switch indication that indicates communications of the first wireless device are to use a second group of antenna elements from the set of different groups of antenna elements.

An apparatus for wireless communications is described. The apparatus may include a processor, memory coupled to the processor, the processor and memory configured to transmit, from a first wireless device to a second wireless device in communications with the first wireless device using a first group of antenna elements, an indication of a set of different groups of antenna elements and one or more attributes of each group in the set of different groups of antenna elements, the one or more attributes including one or more beam characteristics associated with each group, where each group includes one or more antenna elements from one or more of a set of multiple arrays or subarrays of antenna elements. The processor and memory may be further configured to receive, from the second wireless device in response to the indication of the set of different groups of antenna elements, an antenna group switch indication that indicates communications of the first wireless device are to use a second group of antenna elements from the set of different groups of antenna elements.

Another apparatus for wireless communications is described. The apparatus may include means for transmitting, from a first wireless device to a second wireless device in communications with the first wireless device using a first group of antenna elements, an indication of a set of different groups of antenna elements and one or more attributes of each group in the set of different groups of antenna elements, the one or more attributes including one or more beam characteristics associated with each group, where each group includes one or more antenna elements from one or more of a set of multiple arrays or subarrays of antenna elements. The apparatus may further include means for receiving, from the second wireless device in response to the indication of the set of different groups of antenna elements, an antenna group switch indication that indicates communications of the first wireless device are to use a second group of antenna elements from the set of different groups of antenna elements.

A non-transitory computer-readable medium storing code for wireless communications is described. The code may include instructions executable by a processor to transmit, from a first wireless device to a second wireless device in communications with the first wireless device using a first group of antenna elements, an indication of a set of different groups of antenna elements and one or more attributes of each group in the set of different groups of antenna elements, the one or more attributes including one or more beam characteristics associated with each group, where each group includes one or more antenna elements from one or more of a set of multiple arrays or subarrays of antenna elements. The code may further include instructions executable by a processor to receive, from the second wireless device in response to the indication of the set of different groups of antenna elements, an antenna group switch indication that indicates communications of the first wireless device are to use a second group of antenna elements from the set of different groups of antenna elements.

In some examples of the method, apparatuses, and non-transitory computer-readable medium described herein, the first wireless device may be in communications with the second wireless device via a millimeter frequency wave band.

In some examples of the method, apparatuses, and non-transitory computer-readable medium described herein, the one or more attributes of each group in the set of different groups of antenna elements further include one or more of a set of antenna indices of the antenna elements in each group, an antenna array size and geometry of each group, or any combinations thereof.

In some examples of the method, apparatuses, and non-transitory computer-readable medium described herein, the indication of each group and the one or more attributes associated with each group may be provided as the set of antenna indices that may be enabled when the group may be selected.

In some examples of the method, apparatuses, and non-transitory computer-readable medium described herein, the one or more beam characteristics of each group in the set of different groups of antenna elements include one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof.

In some examples of the method, apparatuses, and non-transitory computer-readable medium described herein, the indication of the set of different groups of antenna elements and the one or more attributes of the different groups of antenna elements may be transmitted to the second wireless device in a control channel transmission, in a medium access control control element (MAC-CE), in a radio resource control (RRC) communication, in downlink control information (DCI), or any combinations thereof.

Some examples of the method, apparatuses, and non-transitory computer-readable medium described herein may further include operations, features, means, or instructions for receiving, from the second wireless device, a beam training command associated with each group from the set of different groups of antenna elements, measuring one or more training signals from the second wireless device using each group of the set of different groups of antenna elements, and transmitting, responsive to the measuring, an indication of one or more preferred training signals to the second wireless device.

In some examples of the method, apparatuses, and non-transitory computer-readable medium described herein, the one or more training signals each correspond to a certain group from the set of different groups of antenna elements.

In some examples of the method, apparatuses, and non-transitory computer-readable medium described herein, the set of different groups of antenna elements may be determined based on a power consumption associated with a carrier frequency of the millimeter wave frequency band, a performance metric associated with the carrier frequency of the millimeter wave frequency band, or any combinations thereof.

In some examples of the method, apparatuses, and non-transitory computer-readable medium described herein, the first wireless device may be a UE in a wireless communications system and the second wireless device may be a base station in the wireless communications system.

In some examples of the method, apparatuses, and non-transitory computer-readable medium described herein, each of the first wireless device and the second wireless device may be one of a base station, a customer premise equipment (CPE), a relay device, a router, a repeater, or an integrated access and backhaul (IAB) node.

A method for wireless communications is described. The method may include receiving, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, the one or more attributes of each group in the set of different groups of antenna elements including one or more beam characteristics associated with each group, where each group includes one or more antenna elements from one or more of a set of multiple arrays or subarrays of antenna elements. The method may further include transmitting, to the first wireless device, an antenna group switch indication that indicates communications of the first wireless device are to use the second group of antenna elements.

An apparatus for wireless communications is described. The apparatus may include a processor, memory coupled to the processor, the processor and memory configured to receive, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, the one or more attributes of each group in the set of different groups of antenna elements including one or more beam characteristics associated with each group, where each group includes one or more antenna elements from one or more of a set of multiple arrays or subarrays of antenna elements. The processor and memory may further be configured to transmit, to the first wireless device, an antenna group switch indication that indicates communications of the first wireless device are to use the second group of antenna elements.

Another apparatus for wireless communications is described. The apparatus may include means for receiving, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, the one or more attributes of each group in the set of different groups of antenna elements including one or more beam characteristics associated with each group, where each group includes one or more antenna elements from one or more of a set of multiple arrays or subarrays of antenna elements. The apparatus may further include means for transmitting, to the first wireless device, an antenna group switch indication that indicates communications of the first wireless device are to use the second group of antenna elements.

A non-transitory computer-readable medium storing code for wireless communications is described. The code may include instructions executable by a processor to receive, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, the one or more attributes of each group in the set of different groups of antenna elements including one or more beam characteristics associated with each group, where each group includes one or more antenna elements from one or more of a set of multiple arrays or subarrays of antenna elements. The code may further include instructions executable by a processor to transmit, to the first wireless device, an antenna group switch indication that indicates communications of the first wireless device are to use the second group of antenna elements.

In some examples of the method, apparatuses, and non-transitory computer-readable medium described herein, the one or more attributes of each group in the set of different groups of antenna elements further include one or more of a set of antenna indices of the antenna elements in each group, an antenna array size and geometry of each group, or any combinations thereof.

In some examples of the method, apparatuses, and non-transitory computer-readable medium described herein, the indication of each group and the one or more attributes associated with each group may be provided as the set of antenna indices that may be enabled when the group may be selected.

In some examples of the method, apparatuses, and non-transitory computer-readable medium described herein, the one or more beam characteristics of each group in the set of different groups of antenna elements include one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof.

In some examples of the method, apparatuses, and non-transitory computer-readable medium described herein, the indication of the set of different groups of antenna elements and the one or more attributes of the different groups of antenna elements may be received from the first wireless device in a control channel transmission, in a MAC-CE, in an RRC communication, in DCI, or any combinations thereof.

Some examples of the method, apparatuses, and non-transitory computer-readable medium described herein may further include operations, features, means, or instructions for transmitting, to the first wireless device, a beam training command associated with each group from the set of different groups of antenna elements, transmitting one or more training signals to the first wireless device associated with each group of the set of different groups of antenna elements, and receiving, from the first wireless device responsive to the transmitting the one or more training signals, a measurement report that indicates one or more preferred training signals of the first wireless device.

In some examples of the method, apparatuses, and non-transitory computer-readable medium described herein, the one or more training signals each correspond to a certain group from the set of different groups of antenna elements.

In some examples of the method, apparatuses, and non-transitory computer-readable medium described herein, the first wireless device may be a UE in a wireless communications system and the second wireless device may be a base station in the wireless communications system.

In some examples of the method, apparatuses, and non-transitory computer-readable medium described herein, each of the first wireless device and the second wireless device may be one of a base station, a CPE, a relay device, a router, a repeater, or an IAB node.

A method of wireless communications is described. The method may include identifying, at a first wireless device that is in communications with a second wireless device via a millimeter wave frequency band using a first group of antenna elements, a set of different groups of antenna elements for use in communications via the millimeter wave frequency band, where each group includes one or more antenna elements from one or more of a set of arrays or subarrays of antenna elements, transmitting, to the second wireless device, an indication of the set of different groups of antenna elements and one or more attributes associated with each group in the set of different groups of antenna elements, and receiving, from the second wireless device in response to the indication of the set of different groups of antenna elements, an antenna group switch indication that indicates communications of the first wireless device are to use a second group of antenna elements from the set of different groups of antenna elements.

An apparatus for wireless communications is described. The apparatus may include a processor, memory coupled with the processor, the processor and memory configured to identify, at a first wireless device that is in communications with a second wireless device via a millimeter wave frequency band using a first group of antenna elements, a set of different groups of antenna elements for use in communications via the millimeter wave frequency band, where each group includes one or more antenna elements from one or more of a set of arrays or subarrays of antenna elements, transmit, to the second wireless device, an indication of the set of different groups of antenna elements and one or more attributes associated with each group in the set of different groups of antenna elements, and receive, from the second wireless device in response to the indication of the set of different groups of antenna elements, an antenna group switch indication that indicates communications of the first wireless device are to use a second group of antenna elements from the set of different groups of antenna elements.

Another apparatus for wireless communications is described. The apparatus may include means for identifying, at a first wireless device that is in communications with a second wireless device via a millimeter wave frequency band using a first group of antenna elements, a set of different groups of antenna elements for use in communications via the millimeter wave frequency band, where each group includes one or more antenna elements from one or more of a set of arrays or subarrays of antenna elements, transmitting, to the second wireless device, an indication of the set of different groups of antenna elements and one or more attributes associated with each group in the set of different groups of antenna elements, and receiving, from the second wireless device in response to the indication of the set of different groups of antenna elements, an antenna group switch indication that indicates communications of the first wireless device are to use a second group of antenna elements from the set of different groups of antenna elements.

A non-transitory computer-readable medium storing code for wireless communications is described. The code may include instructions executable by a processor to identify, at a first wireless device that is in communications with a second wireless device via a millimeter wave frequency band using a first group of antenna elements, a set of different groups of antenna elements for use in communications via the millimeter wave frequency band, where each group includes one or more antenna elements from one or more of a set of arrays or subarrays of antenna elements, transmit, to the second wireless device, an indication of the set of different groups of antenna elements and one or more attributes associated with each group in the set of different groups of antenna elements, and receive, from the second wireless device in response to the indication of the set of different groups of antenna elements, a beam and antenna group switch indication that indicates communications of the first wireless device are to use a second group of antenna elements from the set of different groups of antenna elements.

In some examples of the method, apparatuses, and non-transitory computer-readable medium described herein, the one or more attributes of each group in the set of different groups of antenna elements include one or more of a set of antenna indices of the antenna elements in each group, an antenna array size and geometry of each group, one or more beam characteristics associated with each group, or any combinations thereof.

In some examples of the method, apparatuses, and non-transitory computer-readable medium described herein, the one or more beam characteristics of each group in the set of different groups of antenna elements include one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof.

In some examples of the method, apparatuses, and non-transitory computer-readable medium described herein, the indication of each group and the one or more attributes associated with each group are provided as the set of antenna indices that are enabled when the group is selected. In some examples of the method, apparatuses, and non-transitory computer-readable medium described herein, the indication of the set of different groups of antenna elements and the one or more attributes of the different groups of antenna elements is transmitted to the second wireless device in a control channel transmission, in a MAC-CE, in an RRC communication, or any combinations thereof.

Some examples of the method, apparatuses, and non-transitory computer-readable medium described herein may further include operations, features, means, or instructions for receiving, from the second wireless device, a beam training command associated with each group from the set of different groups of antenna elements, measuring one or more training signals from the second wireless device using each group of the set of different groups of antenna elements, and transmitting, responsive to the measuring, an indication of one or more preferred training signals to the second wireless device.

In some examples of the method, apparatuses, and non-transitory computer-readable medium described herein, the one or more training signals each correspond to a certain group from the set of different groups of antenna elements. In some examples of the method, apparatuses, and non-transitory computer-readable medium described herein, the millimeter wave frequency band includes frequencies that may be greater than 52.6 GHz. In some examples of the method, apparatuses, and non-transitory computer-readable medium described herein, the set of different groups of antenna elements is determined based on a power consumption associated with a carrier frequency of the millimeter wave frequency band, a performance metric associated with the carrier frequency of the millimeter wave frequency band, or any combinations thereof. In some examples of the method, apparatuses, and non-transitory computer-readable medium described herein, the first wireless device may be a UE in a wireless communications system and the second wireless device may be a base station in the wireless communications system. In some examples of the method, apparatuses, and non-transitory computer-readable medium described herein, each of the first wireless device and the second wireless device may be one of a base station, a CPE, a relay device, a router, a repeater, or an IAB node.

A method of wireless communications is described. The method may include receiving, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, where each group includes one or more antenna elements from one or more of a set of arrays or subarrays of antenna elements, determining to switch communications with the first wireless device from the first group of antenna elements to a second group of antenna elements from the set of different groups of antenna elements, and transmitting, to the first wireless device responsive to the determining, an antenna group switch indication that indicates communications of the first wireless device are to use the second group of antenna elements.

An apparatus for wireless communications is described. The apparatus may include a processor, memory coupled with the processor, the processor and memory configured to receive, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, where each group includes one or more antenna elements from one or more of a set of arrays or subarrays of antenna elements, determine to switch communications with the first wireless device from the first group of antenna elements to a second group of antenna elements from the set of different groups of antenna elements, and transmit, to the first wireless device responsive to the determining, an antenna group switch indication that indicates communications of the first wireless device are to use the second group of antenna elements.

Another apparatus for wireless communications is described. The apparatus may include means for receiving, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, where each group includes one or more antenna elements from one or more of a set of arrays or subarrays of antenna elements, determining to switch communications with the first wireless device from the first group of antenna elements to a second group of antenna elements from the set of different groups of antenna elements, and transmitting, to the first wireless device responsive to the determining, an antenna group switch indication that indicates communications of the first wireless device are to use the second group of antenna elements.

A non-transitory computer-readable medium storing code for wireless communications is described. The code may include instructions executable by a processor to receive, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, where each group includes one or more antenna elements from one or more of a set of arrays or subarrays of antenna elements, determine to switch communications with the first wireless device from the first group of antenna elements to a second group of antenna elements from the set of different groups of antenna elements, and transmit, to the first wireless device responsive to the determining, an antenna group switch indication that indicates communications of the first wireless device are to use the second group of antenna elements.

In some examples of the method, apparatuses, and non-transitory computer-readable medium described herein, the one or more attributes of each group in the set of different groups of antenna elements include one or more of a set of antenna indices of the antenna elements in each group, an antenna array size and geometry of each group, one or more beam characteristics associated with each group, or any combinations thereof.

In some examples of the method, apparatuses, and non-transitory computer-readable medium described herein, the one or more beam characteristics of each group in the set of different groups of antenna elements include one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof.

In some examples of the method, apparatuses, and non-transitory computer-readable medium described herein, the indication of each group and the one or more attributes associated with each group may be provided as the set of antenna indices that are enabled when the group may be selected. In some examples of the method, apparatuses, and non-transitory computer-readable medium described herein, the indication of the set of different groups of antenna elements and the one or more attributes of the different groups of antenna elements are received from the first wireless device in a control channel transmission, in a MAC-CE, in an RRC communication, or any combinations thereof.

Some examples of the method, apparatuses, and non-transitory computer-readable medium described herein may further include operations, features, means, or instructions for transmitting, to the first wireless device, a beam training command associated with each group from the set of different groups of antenna elements, transmitting one or more training signals to the first wireless device associated with each group of the set of different groups of antenna elements, and receiving, from the first wireless device responsive to the transmitting the one or more training signals, a measurement report that indicates one or more preferred training signals of the first wireless device.

In some examples of the method, apparatuses, and non-transitory computer-readable medium described herein, the one or more training signals each correspond to a certain group from the set of different groups of antenna elements. In some examples of the method, apparatuses, and non-transitory computer-readable medium described herein, the millimeter wave frequency band includes frequencies that may be greater than 52.6 GHz. In some examples of the method, apparatuses, and non-transitory computer-readable medium described herein, the first wireless device may be a UE in a wireless communications system and the second wireless device may be a base station in the wireless communications system. In some examples of the method, apparatuses, and non-transitory computer-readable medium described herein, each of the first wireless device and the second wireless device may be one of a base station, a CPE, a relay device, a router, a repeater, or an IAB node.

DETAILED DESCRIPTION

Figure 1:
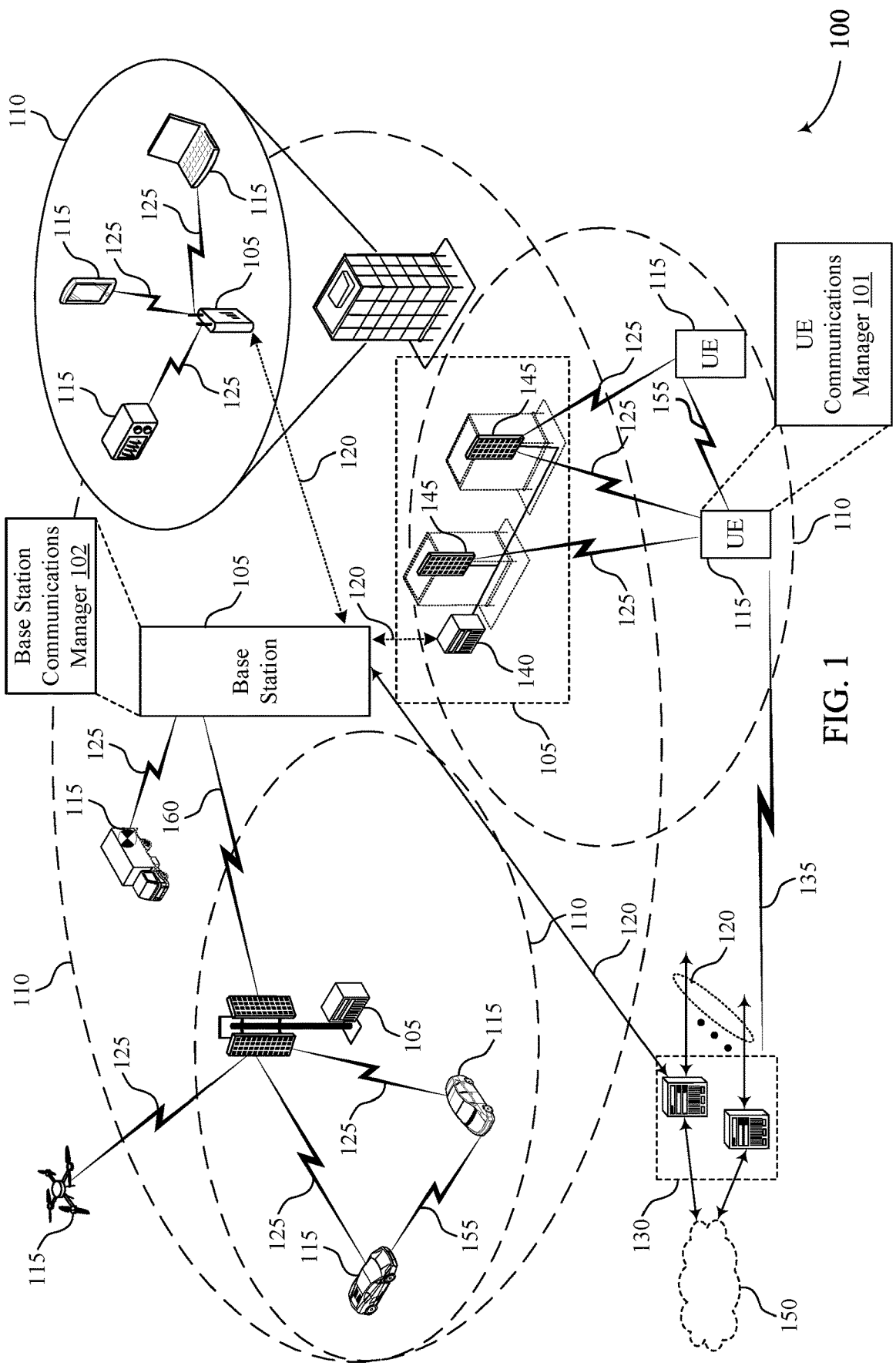
FIG. 1 illustrates an example of a system for wireless communications that supports antenna group selection and indication in frequency bands in accordance with one or more aspects of the present disclosure.

In some deployments, wireless communications systems may operate in millimeter wave (mmW) frequency ranges (e.g., 24 GHz, 26 GHz, 28 GHz, 39 GHz, 52.6-71 GHz, etc.). Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration and blockage losses in mmW communications systems, transmissions between wireless devices (e.g., from a base station and/or a UE) may be beamformed. Moreover, a receiving device may use beamforming techniques to configure antenna(s) and/or antenna array(s) and/or antenna array module(s) such that transmissions are received in a directional manner.

In some deployments, communications in mmW frequencies may utilize what is referred to as frequency range 2 (FR2), corresponding to deployments in 24-52.6 GHz (e.g., 24 GHz. 26 GHz, 28 GHz, 39 GHz, etc.). As demand for wireless communications increases, additional mmW frequencies may be desirable for some deployments, such as frequency range 4 (FR4) (also informally known as or upper mmW bands) which may be associated with 52.6 GHz and beyond. In many FR2 deployments, wireless devices use antenna modules that include a number of antenna elements, such as an array of four antenna elements per module in a 4×1 array arrangement, among other example configurations. Upper mmW bands have shorter wavelengths, and thus more antenna elements can be placed in the same physical aperture in FR4 than at FR2. For example, an FR4 device may have multiple antenna modules that each contain four 4×4 subarrays. In some cases, it may be easier for a wireless device (e.g., a UE) to use or manage some possible combinations of antenna elements across subarrays within an antenna module or across antenna modules than others.

Various aspects of the present disclosure provide techniques for a first wireless device, such as a UE, to select a set of different groups of antenna elements that are preferred for use at the first wireless device, and to provide an indication of the set of different groups of antenna elements to a second wireless device, such as a base station. In some examples, the indication may also include one or more antenna group attributes such as one or more beam characteristics associated with each group (e.g., one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof), one or more of a set of antenna indices of the antenna elements in each group, an antenna array size and geometry of each group, or any combinations thereof. A narrowest beamwidth may, for example, have the smallest azimuthal width and elevational width in angular dimensions (e.g., compared to beamwidths of other groups) in which communications are still effective. As beamwidth relates closely to directivity and gain, alteration of beamwidth provides proportional changes in both these parameters. In addition, the signal to noise ratio (SNR), e.g., the ratio of signal strength to unwanted interference (noise), also changes accordingly. If beamwidth is narrowed, gain and directivity will increase. This also increases the SNR. For this reason, narrow beamwidths are an effective tool for some forms of communication. An array gain, for example, may relate to a power gain of transmitted or received signals that may be achieved by using multiple antennas or antenna elements at a transmitter or receiver. In some cases, the array gain may be the ratio of the array SNR and the individual antenna SNR. The peak array gains possible in azimuth and/or elevation from each group may be determined by determining an array gain with respect to each antenna in one or more of the azimuth and/or elevation directions. The peak array gain may be determined based on the antenna with largest array gain of each group in one or more of the azimuth and/or elevation directions. The side lobes observed in azimuth and/or elevation and associated with peak array gains from each group, for example, may be an effect of the antennas in each group where each antenna element radiates. The neighboring radiation may cause diffraction which may appear in the radiation pattern of the antenna array in one or more of the azimuth and/or elevation directions and may be affected by the peak array gain. The second wireless device, in some cases, may initiate a beam training based on the set of different groups of antenna elements in order to establish one or more beams to be used for communications using one or more of the different groups of antenna elements that were indicated by the first wireless device.

Such techniques may be useful to indicate preferred groups of antenna elements. For example, thermal management may indicate that only a certain number of antenna elements at a particular subarray of an antenna module are desired to be used due to relatively high temperatures at that particular subarray. The wireless device in such cases may select different groups of antenna elements based on such thermal management. Additionally or alternatively, different antenna subarrays of an antenna module may each have a separate radio frequency integrated circuit (RFIC), and it may be desirable to enable less than all of the RFICs in order to conserve power and avoid overheating, and thus it may be desirable to avoid using antenna elements associated with one or more RFICs which may impact selection of the set of different groups of antenna elements. Similarly, maximum permissible exposure (MPE) limits may result in some antenna elements of one or more subarrays being unavailable for a period of time, which may also impact selection of the set of different groups of antenna elements.

Thus, techniques such as discussed herein provide for enhanced antenna module management at a wireless device, which may allow for different combinations of antenna elements to be used based on operating conditions at the wireless device. Such techniques may enhance efficiency of a wireless device by providing communications using preferred groups of antenna elements, which may result in reduced power consumption, enhanced bandwidth, or both, when certain antenna modules or subarrays are desired to be powered down or unused based on current conditions.

Aspects of the disclosure are initially described in the context of wireless communications systems. Examples of antenna modules and groups of antenna elements are then discussed for some aspects. Aspects of the disclosure are further illustrated by and described with reference to apparatus diagrams, system diagrams, and flowcharts that relate to antenna group selection and indication in millimeter wave bands.

FIG. 1 illustrates an example of a wireless communications system 100 that supports antenna group selection and indication in frequency bands in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, repeater devices, CPE, IAB nodes, router devices, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, the one or more base stations 105 may provide backhaul connectivity between another base station 105 and core network 130 via a backhaul link 160 while acting as an IAB node. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays, routers, or CPE, as well as the base stations 105 and the network equipment including macro eNBs or gNBs, small cell eNBs or gNBs, IAB nodes, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 Megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

o The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Signal waveforms transmitted over a carrier may be made up of multiple subcarriers (e.g., using multi-carrier modulation (MCM) techniques such as orthogonal frequency division multiplexing (OFDM) or DFT-s-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \times N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 MHz to 300 gigahertz (GHz). Oftentimes, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming.

The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

UEs 115 may include one or more antenna modules that may include a relatively large number of antenna elements for mmW communications, and may be an example of a first wireless device as discussed herein. A UE communications manager 101 may manage mmW communications, and in some cases may select a set of different groups of antenna elements from one or more antenna modules that are preferred for use at the UE 115. The UE communications manager 101 may provide an indication of the set of different groups of antenna elements to a second wireless device, such as a base station 105. The second wireless device, in some cases, may initiate a beam training based on the set of different groups of antenna elements in order to establish one or more beams to be used for communications using one or more of the different groups of antenna elements that were indicated by the UE communications manager 101.

One or more of the base stations 105 may be an example of a second wireless device as discussed herein, and may include a base station communications manager 102. The base station communications manager 102 may receive the indication of the set of different groups of antenna elements from the first wireless device, and may in some cases initiate a beam training procedure based on the set of different groups of antenna elements. The beam training procedure may be used to determine one or more beams to be used for communications using one or more of the different groups of antenna elements that were indicated by the first wireless device.

Figure 2:
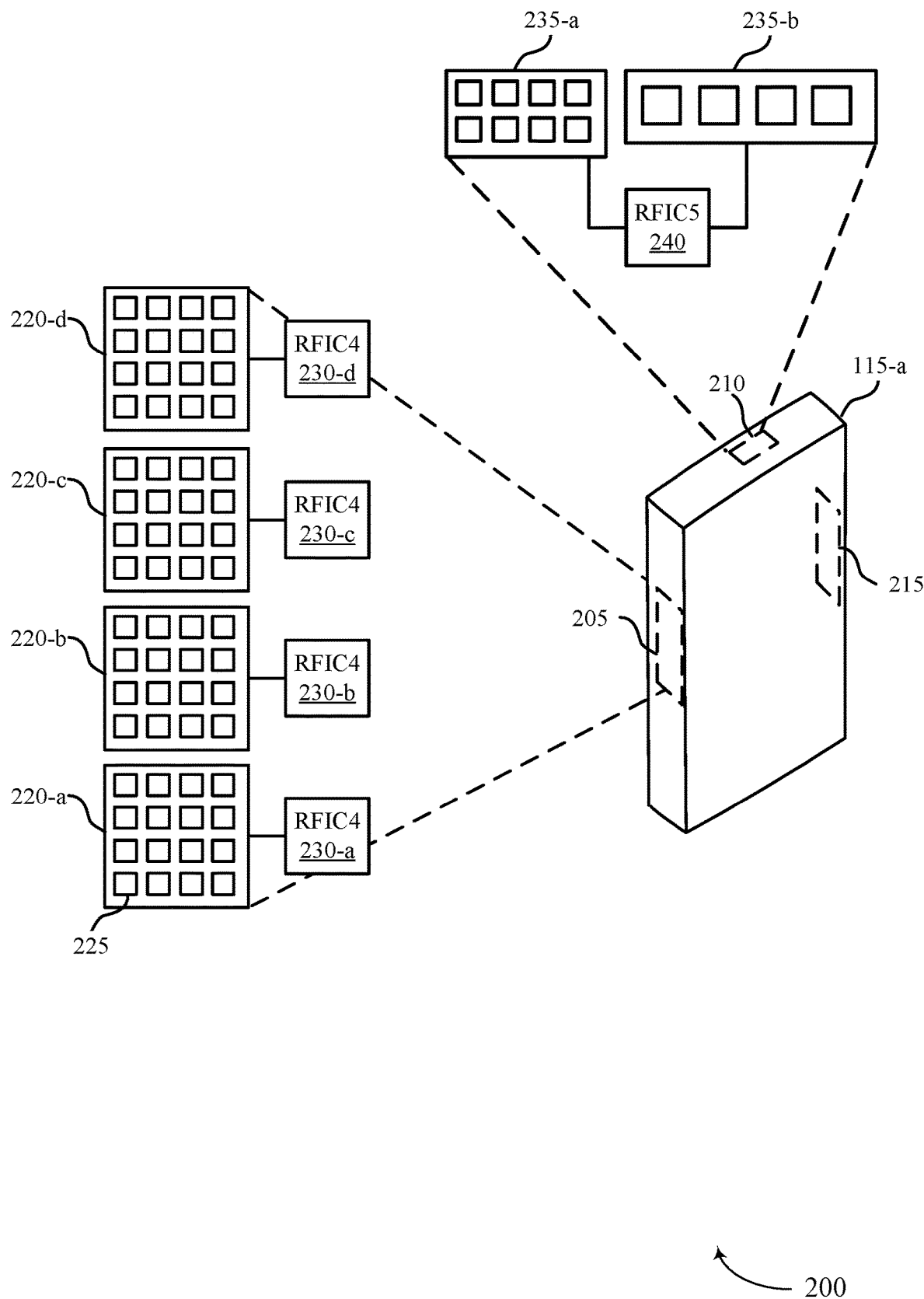
FIG. 2 illustrates an example of a wireless communication device with multiple antenna arrays that supports antenna group selection and indication in frequency bands in accordance with one or more aspects of the present disclosure.

FIG. 2 illustrates an example of a wireless communication device with multiple antenna arrays 200 that supports antenna group selection and indication in frequency bands in accordance with one or more aspects of the present disclosure. In some examples, a wireless communication device with multiple antenna arrays 200 may implement aspects of wireless communications system 100. In this example, the wireless communication device may be a UE 115-a, although in other cases the wireless communication device may be a different device, such as a CPE, a relay device, a router, a repeater, or an IAB node.

In this example, the UE115-a includes a number of different antenna modules, including a first antenna module 205, a second antenna module 210, and a third antenna module 215. Each of the antenna modules 205 through 215 may include a number of subarrays 220 of antenna elements. In this example, the first antenna module 205 may include four subarrays 220, including a first subarray 220-a, a second subarray 220-b, a third subarray 220-c, and a fourth subarray 220-d. Each subarray 220 in this example may include 16 individual antenna elements 225 arranged in a 4×4 array configuration. Each antenna element 225, in some cases, may be a patch antenna element configured to communicate in a high-band mmW deployment. In some cases, the spacing of antenna elements 225 within each subarray 220 may be configured to provide for efficient analog beamforming at wavelengths associated with high-band mmW communications. Further, in this example, each subarray 220 may include an associated RFIC 230.

In the example of FIG. 2, the second antenna module 210 also may include multiple subarrays 235, including a fifth subarray 235-a and a sixth subarray 235-b. In this example, the fifth subarray 235-a includes eight antenna elements arranged in a 4×2 array configuration, and the sixth subarray 235-b includes four antenna elements arranged in a 4×1 array configuration. In this case, a single RFIC (RFICS) 240 may be coupled with the subarrays 235, although multiple RFICs may be used or an RFIC may be shared with one or more other of the antenna modules 205 or 215. While the antenna module 210 is illustrated as having multiple subarrays 235 that are different sizes, other examples may have a same number of subarrays 235 with each subarray having a same size (e.g., four 4×4 antenna subarrays similarly as illustrated in the first antenna module 205). Techniques as discussed herein may be applied to any numbers of antenna modules 205 through 215, any numbers of subarrays included in each antenna module, any numbers of antennas per subarray, or any combinations thereof.

As discussed herein, multiple RFICs 230 and associated antenna subarrays 220 may be used at different times by the wireless device. For example, in the case of FIG. 2 where the wireless device is UE 115-a, it may be desirable to operate using a subset of the antenna modules 205-215, using a subset of antenna subarrays 220 and associated RFICs 230, using a subset of antenna elements 225 within one or more subarrays 220, or any combinations thereof. Such operations may allow the UE 115-a to manage power consumption in order to reduce power used by RFIC components, for example. In other cases, the UE 115-a may determine, in addition or alternatively to power consumption considerations, that one or more MPE limitations, one or more thermal limitations, or combinations thereof, make it desirable to use some groups of antenna elements 225 of one or more subarrays 220. Thus, even though a relatively large number of antenna elements 225 are available at the UE 115-a, not all elements may be used at any particular instant in time. For example, the UE 115-a may have a total of N antenna elements 225 across each of the different antenna modules 205-215, and may choose K antenna elements 225 for communications, which results in $^{N}C_{K}$ possibilities, which can result in a relatively large number of combinations of different antenna elements 225. Thus, in some cases, the UE 115-a may select a relatively small list of antenna groups that are useful at a given time (e.g., based on power consumption, MPE consideration, thermal considerations, etc.). The UE 115-a may provide an indication of the selected antenna groups to a second wireless device (e.g., a base station), and communications using one of the indicated antenna groups may be established. Various examples of indications of a set of different antenna groups and procedures based on such indications are discussed with reference to FIGS. 3 through 5.

Figure 3:
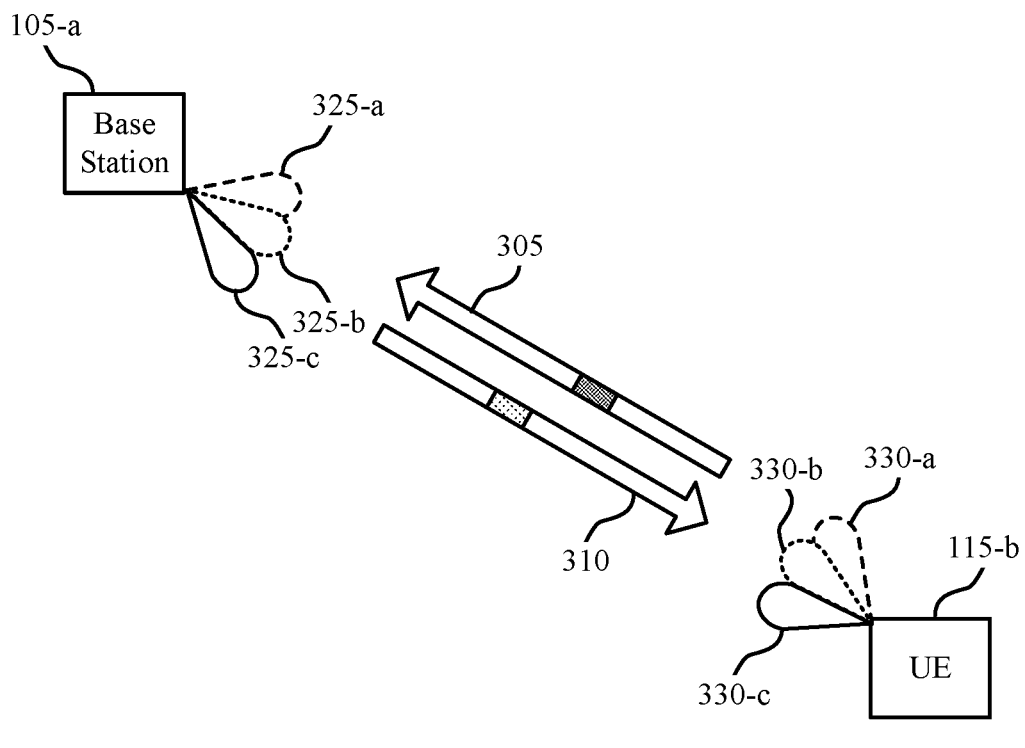
FIG. 3 illustrates an example of a portion of a wireless communications system that supports antenna group selection and indication in frequency bands in accordance with one or more aspects of the present disclosure.

FIG. 3 illustrates an example of a wireless communications system 300 that supports antenna group selection and indication in frequency bands in accordance with one or more aspects of the present disclosure. In some examples, wireless communications system 300 may implement aspects of wireless communications system 100. In some examples, the wireless communications system 300 may include a UE 115-b, and a base station 105-a which may be examples of UEs 115 and base stations 105 described with reference to FIGS. 1-2. Further, UE 115-b may be an example of a first wireless device, and the base station 105-a may be an example of a second wireless device. The UE 115-b and base station 105-a may communicate using beamformed communications in which the UE 115-b transmits uplink communications 305 to the base station 105-a, and the base station 105-a transmits downlink communications 310 to the UE 115-b.

In some cases, the UE 115-b may include a relatively large number of antenna elements, which may be spread across one or more antenna subarrays and one or more antenna modules. The UE 115-b may transmit antenna set information 315 to the base station 105-a that indicates a number of different antenna groups that have been selected at the UE 115-*b* and are preferred for use in establishing transmission beams for mmW communications. The base station 105-*a* may receive the antenna set information 315, and determine one or more beamforming parameters for use in communications with the UE 115-*b*. In some cases, based on the antenna set information 315 received from the UE 115-*b*, the base station 105-*a* may transmit an antenna switch indication 320 to the UE 115-*b*, to indicate to switch to one of the indicated antenna groups for subsequent beamformed communications. Such an antenna switch indication 320 may provide an indication to switch antenna groups, switch a beam to be used for communications (e.g., to a preferred beam associated with the antenna group), or any combinations thereof (e.g., to use a different antenna group but with the same resultant beam, to use a different beam within a same antenna group (e.g., that uses fewer antenna elements for beamforming), or switch to a different beam and a different antenna group).

In some cases, the beam and antenna switch indication 320 may initiate one or more procedures to use one of the indicated antenna groups, such as by initiating a beam training procedure based on the indicated antenna groups, where different base station beams 325 and different UE beams 330 may be tested and measured to identify a preferred beam for communications. For example, the UE 115-*b* may measure reference signals of multiple base station beams 325 using multiple UE beams 330 and select a preferred beam, and provide feedback to the base station 105-*a* on the selected beam, such as through a chosen transmission configuration indication (TCI) state. In some cases, the UE 115-*b* may transmit a CSI measurement report to the base station 105-*a* based on measurements of the beam training procedure.

Such indications provided by the UE 115-*b* may be used to determine rate and power control for communications, and the number of antennas that are used may determine array gain and thus achievable data rates, as well as to determine transmit power to be used to be within a certain link budget. Further, the antenna information may be used for beam switching and maintenance, and beams used at the base station 105-*a* and UE 115-*b* may be array size dependent. Additionally, the base station 105-*a* may use the indication of antenna groups to help with scheduling, as better rates with different array sizes may lead to better scheduling possibilities. In some cases, the antenna set information 315 provided by the UE 115-*b* may include full or partial information on the selected different groups of antenna elements. For example, full information may be antenna indices excited in each group (e.g., a listing of each index value of each antenna element of a group, including antenna index, an identification of a subarray, and an indication of an antenna module). Partial information may include, for example, an array size of each group of antenna elements (e.g., 2×2, 4×1, etc.). Partial information may also include information about array geometry (e.g., planar array, linear array, distributed array, irregular array, etc.). Further, partial information may include information about a narrowest beam width, best array gains, and highest side lobes seen with beams useable on each group.

Figure 4:
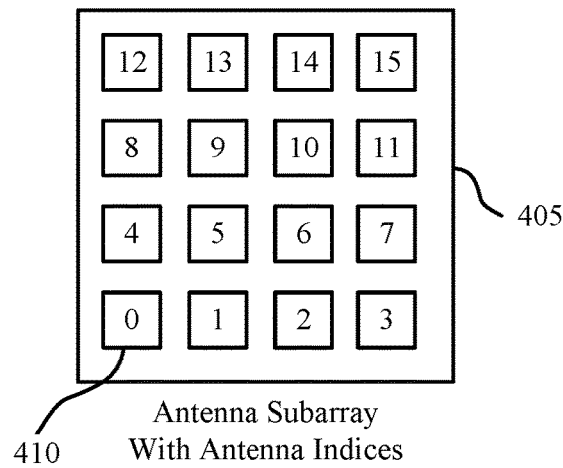
FIG. 4 illustrates an example of antenna groups of an antenna array that supports antenna group selection and indication in frequency bands in accordance with one or more aspects of the present disclosure.
Figure 4:
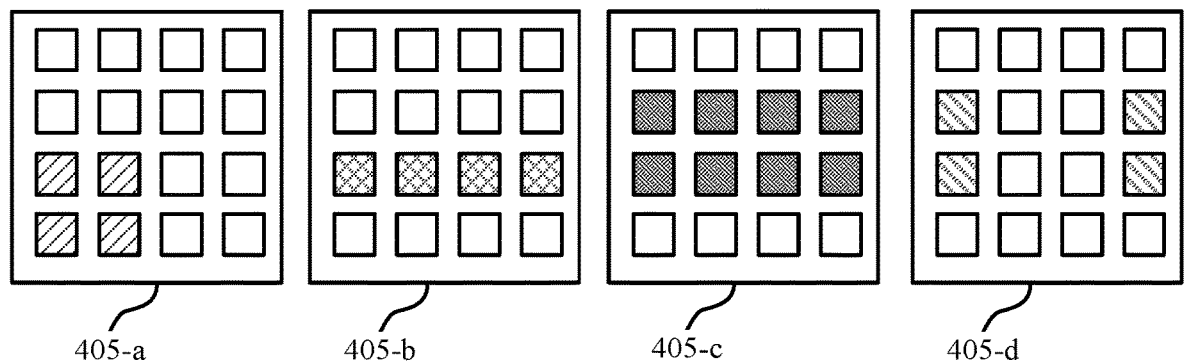
Figure 4:
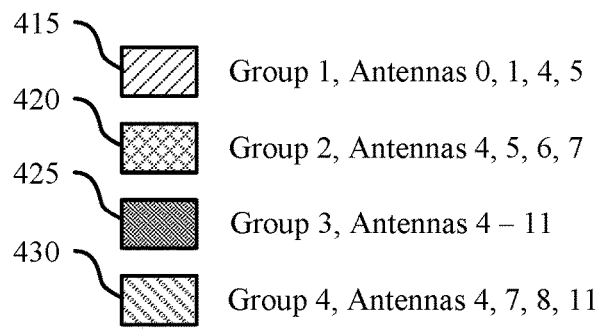

FIG. 4 illustrates an example of antenna groups of an antenna array 400 that supports antenna group selection and indication in frequency bands in accordance with one or more aspects of the present disclosure. In some examples, antenna groups of an antenna array 400 may implement aspects of wireless communications system 100 or 300. In this example, an antenna subarray 405 may include a number of individual antenna elements 410, and in this example is a 4×4 subarray with 16 antenna elements 410. Antenna subarray 405 may be one of a number of different subarrays that are included in an antenna module (e.g., an antenna module 205, 210, or 215 of FIG. 2). While referred to as subarrays of an antenna module as discussed herein, in other cases such a set of antenna elements 410 may be referred to simply as an antenna array (e.g., which may be part of a super-array with multiple antenna arrays of an antenna module), or by any of a number of other terms associated with a particular set or subset of antenna elements of a wireless device.

In this example, each antenna element 410 of antenna subarray 405 may have an antenna index that maps each particular antenna element 410 to a location of the antenna subarray 405. In some cases, a first wireless device may include the antenna subarray 405 may transmit an indication of a set of different groups of antenna elements to a second wireless device for use in establishing a beam for wireless communications, determining one or more parameters for beamformed transmissions (e.g., an MCS, transmission power, etc.), or any combinations thereof. In this example, the first wireless device may select four groups of antenna elements, including a first group 405-*a* that may be a planar 2×2 array, a second group 405-*b* that may be a linear 4×1 array, a third group 405-*c* that may be a planar 4×2 array, and a fourth group 405-*d* that may be a distributed array of two 2×1 arrays. As discussed with reference to FIG. 3, in some cases the first wireless device may transmit an indication of the set of different groups of antenna elements to the second wireless device, which may include full or partial information on the selected different groups of antenna elements.

Table 1 below provides one example of different types of full or partial information that may be provided. In this example, full information may be antenna indices excited in each group (e.g., a listing of each index value of each antenna element of a group as indicated in the "Antenna indices" column of Table 1). In other cases, the full information may also include an identification of a subarray of a number of different subarrays, an indication of an antenna module of a number of different antenna modules, or any combinations thereof. Further, in this example, partial information may include an array size of each group of antenna elements (e.g., a number of antenna elements of each group as indicated in the "Number of elements" column of Table 1), array geometry (e.g., planar array, linear array, distributed array, irregular array, etc., along with a number of antenna elements in different dimensions as indicated in the "Array type" column of Table 1), information about a narrowest beam width (e.g., as indicated in the "Narrowest beamwidth" column of Table 1), best array gains, highest side lobes seen with beams useable on each group, or any combinations thereof. In some cases, the information regarding the different selected groups of antennas may be provided by the first wireless device to the second wireless device in control signaling (e.g., in a control channel transmission such as in an uplink control channel, downlink control channel, or sidelink control channel transmission), in a MAC-CE, or combinations thereof. In some cases, antenna group information may be provided in RRC signaling. Additionally or alternatively, the first wireless device may be configured by a different wireless device (e.g., a base station or node of a core network) to provide information related to selected antenna groups, such as by RRC configuration.

TABLE 1

Full or Partial Antenna Group Information

| Antenna group | Number of elements | Antenna indices | Array type | Narrowest beamwidth |
|---|---|---|---|---|
| Group 1 | 4 | 0, 1, 4, 5 | Planar 2 × 2 | 55° × 55° |
| Group 2 | 4 | 4, 5, 6, 7 | Linear 4 × 1 | 25° × 90° |
| Group 3 | 8 | 4-11 | Planar 4 × 2 | 55° × 25° |
| Group 4 | 4 | 4, 7, 8, 11 | Distributed 2*(2 × 1) | 55° (with grating lobes) |

Figure 5:
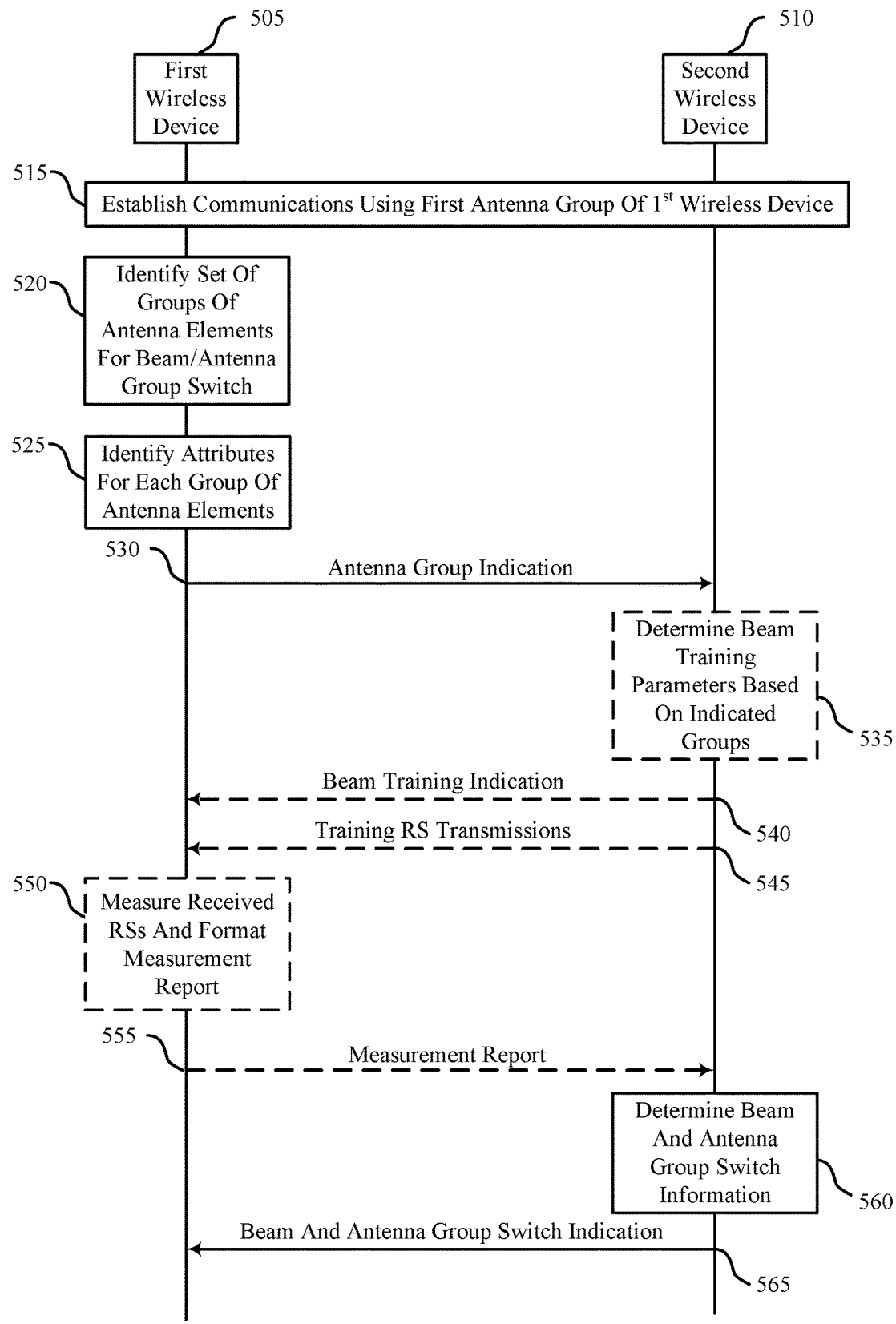
FIG. 5 illustrates an example of a process flow that supports antenna group selection and indication in frequency bands in accordance with one or more aspects of the present disclosure.

FIG. 5 illustrates an example of a process flow 500 that supports antenna group selection and indication in frequency bands in accordance with one or more aspects of the present disclosure. In some examples, process flow 500 may implement aspects of wireless communications system 100 or 300. Process flow 500 may be implemented by first wireless device 505 and a second wireless device 510 as described herein. Alternative examples of the following may be implemented, where some steps are performed in a different order than described or are not performed at all. In some cases, steps may include additional features not mentioned below, or further steps may be added.

At 515, the first wireless device 505 and the second wireless device 510 may establish communications using a first antenna group of the first wireless device. In some cases, the first wireless device 505 and the second wireless device 510 may establish communications according to a beam training procedure as part of an initial access of the first wireless device 505 at the second wireless device 510, or as part of a beam training and refinement procedure.

At 520, the first wireless device 505 may identify a set of groups of antenna elements for beam or antenna group switching. In some cases, the first wireless device 505 may identify one or more subarrays of antenna elements that are desired to be used for beamformed communications. For example, the first wireless device 505 may have a number of different antenna modules, each of which may have one or more antenna subarrays. Further, in some cases, each antenna subarray may have its own associated RFIC. The first wireless device 505 may desire to limit the number of antenna modules and/or RFICs that are active at any particular time, in order to conserve power, manage thermal properties, manage MPE, or any combinations thereof. In such cases, the first wireless device 505 may identify antenna elements associated with particular antenna subarrays that are desired to be used for a particular time period. The first wireless device 505 may then identify one or more groups of antenna elements of the particular antenna subarrays that may be usable for beamformed communications with the second wireless device 510.

At 525, the first wireless device 505 may identify attributes for each group of antenna elements period in some cases, first wireless device 505 may identify antenna indices that are mapped with antenna elements at each antenna subarray. In such cases, the first wireless device 505 may identify antenna indices of each antenna element in each group of antenna elements as the associated attributes. In other cases, the attributes for each group of antenna elements may include partial information for each of the identified groups of antenna elements. Such partial information may include, for example, an array geometry, an array size, a number of antenna elements in the array, an array type, the narrowest beam width associated with the antenna group, or any combinations thereof. At 530, the first wireless device 505 may transmit an antenna group indication to the second wireless device 510. The antenna group indication may include the identified attributes for each group of antenna elements.

Optionally, at 535, the second wireless device 510 may determine beam training parameters based on the indicated antenna groups provided in the antenna group indication. In some cases, the second wireless device 510 may identify particular beams that are suitable for communications with the identified groups of antenna elements. Optionally, at 540, the second wireless device 510 may transmit a beam training indication to the first wireless device 505. The beam training indication may indicate that one or more reference signals are to be transmitted using one or more beams in accordance with the determined beam training parameters. Optionally, at 545, the second wireless device 510 may transmit reference signal transmissions (e.g., CSI reference signals using two or more determined beams) according to the determined beam training parameters. Optionally, at 550, the first wireless device 505 may measure received reference signals and transmit a measurement report (e.g., a CSI measurement report), which may include an indication of a preferred beam that is identified at the first wireless device 505. Optionally, at 555, the measurement report may be transmitted to the second wireless device 510.

At 560, the second wireless device 510 may determine beam and antenna group switch information. In some cases, the beam and antenna group switch information may be determined based on the antenna group indication received from the first wireless device 505, based on the measurement report if provided by the first wireless device 505, or any combinations thereof. At 565, the second wireless device 510 may transmit an antenna group switch indication to the first wireless device 505. Subsequently, the first wireless device 505 and the second wireless device 510 may communicate using one or more beams or antenna groups that are indicated in the antenna group switch indication. In some cases, a new transmission or reception beam at the first wireless device 505 may use one or more of the groups of antenna elements that were identified by the first wireless device 505, and may allow the first wireless device 505 to operate in a more power efficient manner, to manage thermal performance of device components, to manage MPE, or any combinations thereof.

Figure 6:
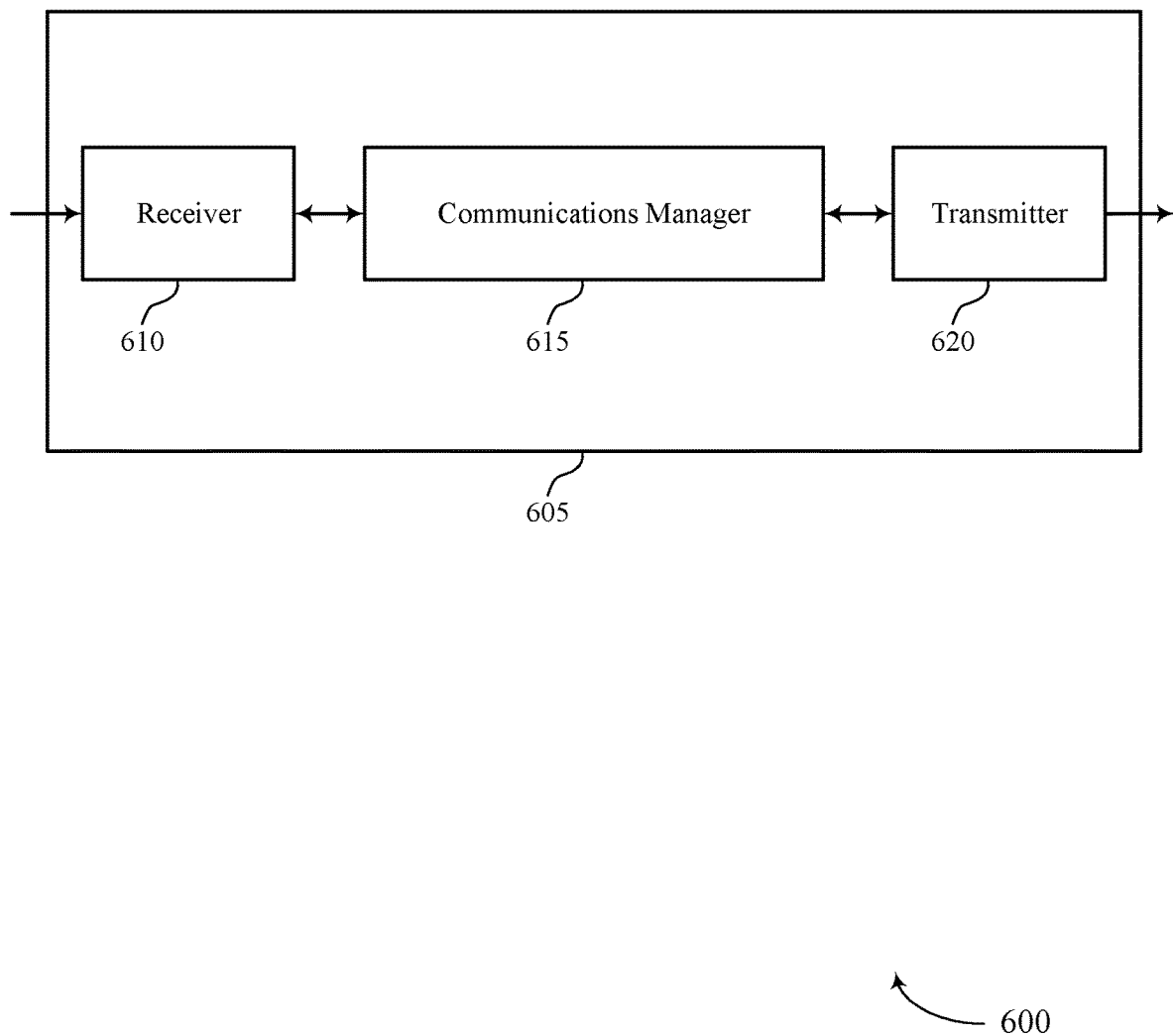
FIGS. 6 and 7 show block diagrams of devices that support antenna group selection and indication in frequency bands in accordance with one or more aspects of the present disclosure.

FIG. 6 shows a block diagram 600 of a device 605 that supports antenna group selection and indication in frequency bands in accordance with one or more aspects of the present disclosure. The device 605 may be an example of aspects of a first wireless device, such as a UE 115, CPE, relay, router, repeater, base station, or IAB node as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to antenna group selection and indication in millimeter wave bands, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit, from a first wireless device to a second wireless device in communications with the first wireless device using a first group of antenna elements, an indication of a set of different groups of antenna elements and one or more attributes associated with each group in the set of different groups of antenna elements, the one or more attributes including one or more beam characteristics associated with each group, where each group includes one or more antenna elements from one or more of a plurality of arrays or subarrays of antenna elements, and receive, from the second wireless device in response to the indication of the set of different groups of antenna elements, an antenna group switch indication that indicates communications of the first wireless device are to use a second group of antenna elements from the set of different groups of antenna elements. The communications manager 615 may be an example of aspects of the communications manager 910 described herein.

The communications manager 615 may as described herein be implemented to realize one or more potential advantages. One implementation may allow the device 605 to provide an indication of preferred antenna groups that may allow for efficient power management, thermal management, or MPE management when using beamformed communications. Further, implementations may allow the device 605 to utilize processing resources more efficiently, among other advantages.

The communications manager 515 may be an example of means for performing various aspects of managing antenna group selection as described herein. The communications manager 515, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 615, or its sub-components, may be implemented in code (e.g., as communications management software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device.

In some examples, the communication manager 615 may be configured to perform various operations (e.g., receiving, transmitting, measuring) using or otherwise in cooperation with the receiver 610, the transmitter 620, or both.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
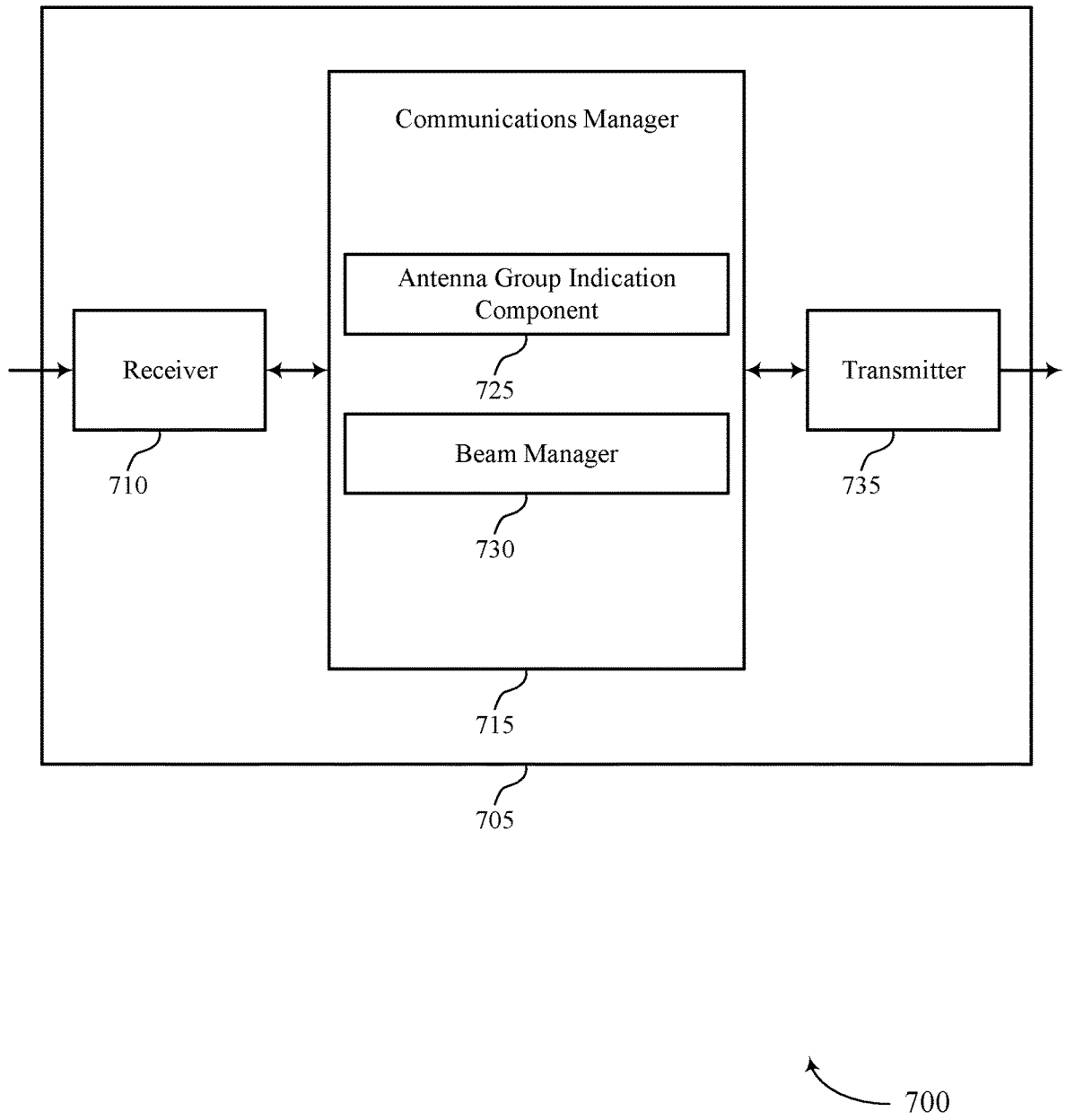

FIG. 7 shows a block diagram 700 of a device 705 that supports antenna group selection and indication in frequency bands in accordance with one or more aspects of the present disclosure. The device 705 may be an example of aspects of a device 605, or a UE 115, CPE, relay, router, base station, or IAB node as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to antenna group selection and indication in millimeter wave bands, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an antenna group indication component 725, and a beam manager 730. The communications manager 715 may be an example of aspects of the communications manager 910 described herein.

The antenna group indication component 725 may transmit, from a first wireless device to a second wireless device in communications with the first wireless device using a first group of antenna elements, an indication of a set of different groups of antenna elements and one or more attributes associated with each group in the set of different groups of antenna elements, the one or more attributes including one or more beam characteristics associated with each group, where each group includes one or more antenna elements from one or more of a plurality of arrays or subarrays of antenna elements.

The beam manager 730 may receive, from the second wireless device in response to the indication of the set of different groups of antenna elements, an antenna group switch indication that indicates communications of the first wireless device are to use a second group of antenna elements from the set of different groups of antenna elements.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
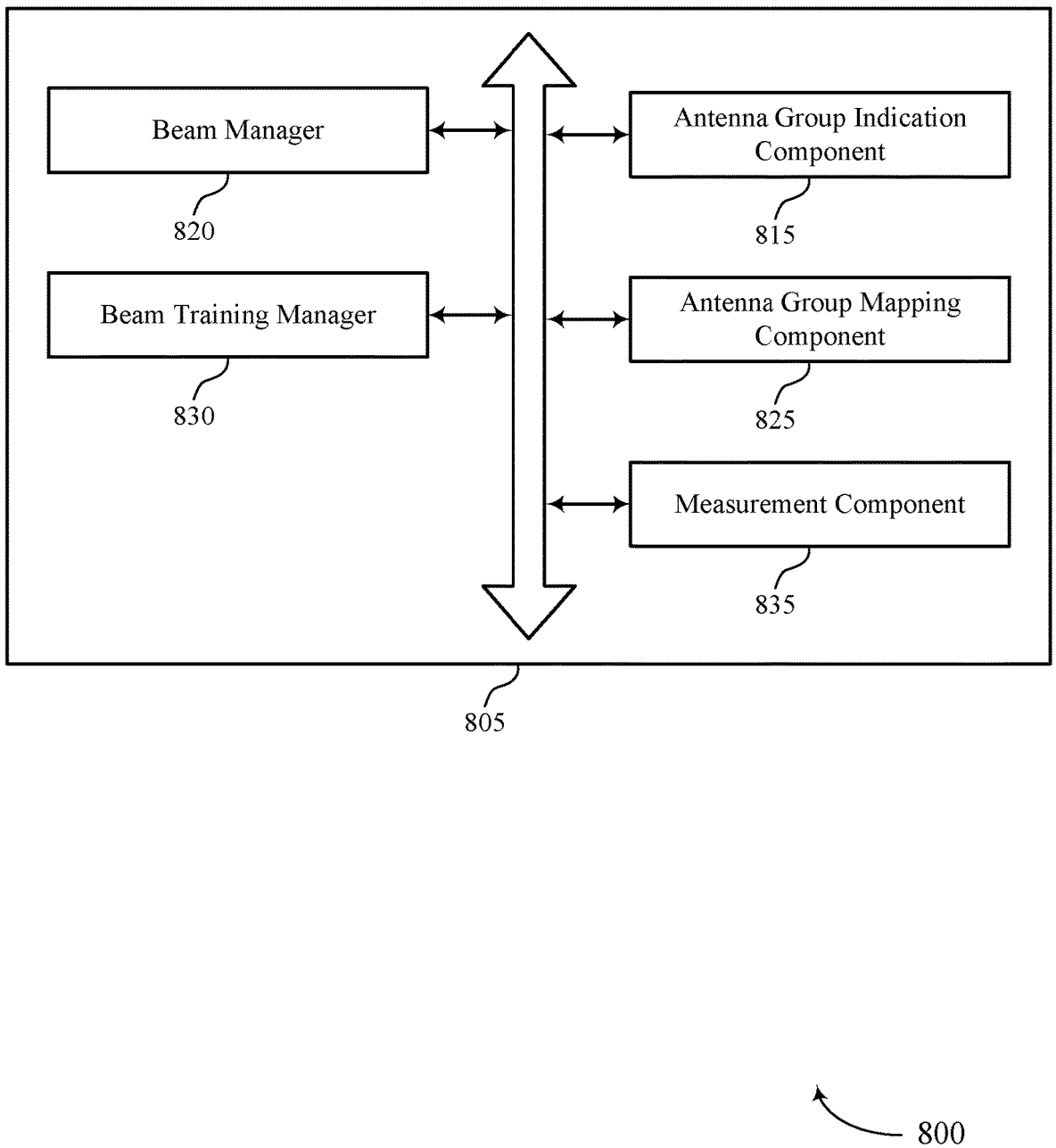
FIG. 8 shows a block diagram of a communications manager that supports antenna group selection and indication in frequency bands in accordance with one or more aspects of the present disclosure.

FIG. 8 shows a block diagram 800 of a communications manager 805 that supports antenna group selection and indication in frequency bands in accordance with one or more aspects of the present disclosure. The communications manager 805 may be an example of aspects of a communications manager 615, a communications manager 715, or a communications manager 910 described herein. The communications manager 805 may include an antenna group indication component 815, a beam manager 820, an antenna group mapping component 825, a beam training manager 830, and a measurement component 835. Each of these modules may communicate, directly or indirectly, with one another (e.g., via one or more buses).

The antenna group indication component 815 may transmit, from a first wireless device to a second wireless device in communications with the first wireless device using a first group of antenna elements, an indication of a set of different groups of antenna elements and one or more attributes associated with each group in the set of different groups of antenna elements, the one or more attributes including one or more beam characteristics associated with each group, where each group includes one or more antenna elements from one or more of a plurality of arrays or subarrays of antenna elements. In some cases, the one or more attributes of each group in the set of different groups of antenna elements further include one or more of a set of antenna indices of the antenna elements in each group, an antenna array size and geometry of each group, or any combinations thereof. In some cases, the one or more beam characteristics of each group in the set of different groups of antenna elements include one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof. In some cases, the indication of the set of different groups of antenna elements and the one or more attributes of the different groups of antenna elements are transmitted to the second wireless device in a control channel transmission, in a MAC-CE, in an RRC communication, in DCI, or any combinations thereof.

In some cases, the first wireless device is a UE in a wireless communications system and the second wireless device is a base station in the wireless communications system. In some cases, each of the first wireless device and the second wireless device is one of a base station, a CPE, a relay device, a router, a repeater, or an IAB node.

The beam manager 820 may receive, from the second wireless device in response to the indication of the set of different groups of antenna elements, an antenna group switch indication that indicates communications of the first wireless device are to use a second group of antenna elements from the set of different groups of antenna elements. In some cases, the millimeter wave frequency band includes frequencies that are greater than 52.6 GHz. In some cases, the set of different groups of antenna elements is determined based on a power consumption associated with a carrier frequency of the millimeter wave frequency band, a performance metric associated with the carrier frequency of the millimeter wave frequency band, or any combinations thereof.

The antenna group mapping component 825 may provide a mapping between antenna elements, antenna groups, antenna modules, or combinations thereof, and one or more indices that may be used for identification. In some cases, the indication of each group and the one or more attributes associated with each group is provided as the set of antenna indices that are enabled when the group is selected.

The beam training manager 830 may receive, from the second wireless device, a beam training command associated with each group from the set of different groups of antenna elements. In some examples, the beam training manager 830 may transmit, responsive to measuring one or more reference signals, an indication of one or more preferred training signals to the second wireless device. In some cases, the one or more training signals each correspond to a certain group from the set of different groups of antenna elements. The measurement component 835 may measure one or more training signals from the second wireless device using each group of the set of different groups of antenna elements.

Figure 9:
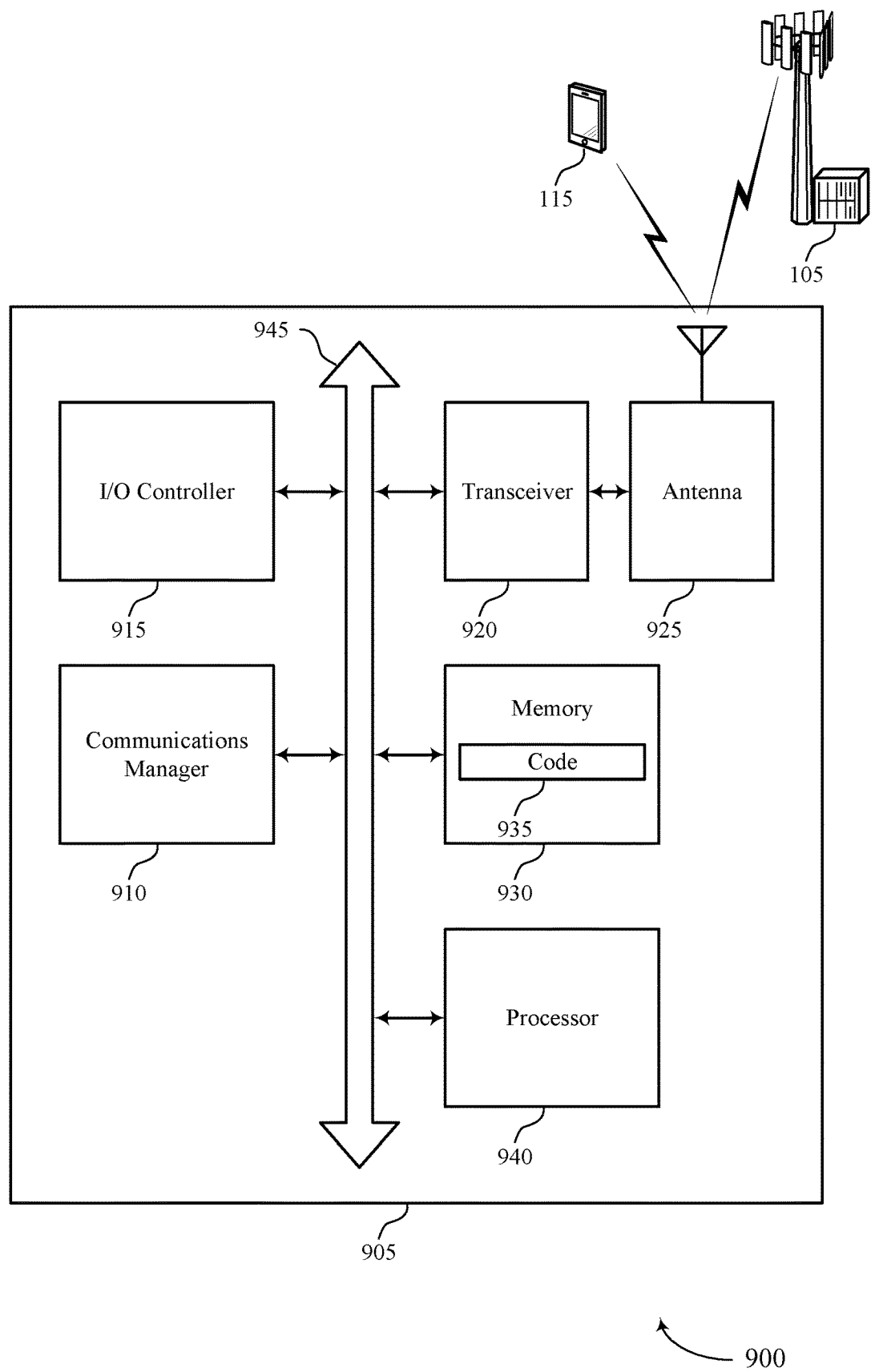
FIG. 9 shows a diagram of a system including a device that supports antenna group selection and indication in frequency bands in accordance with one or more aspects of the present disclosure.

FIG. 9 shows a diagram of a system 900 including a device 905 that supports antenna group selection and indication in frequency bands in accordance with one or more aspects of the present disclosure. The device 905 may be an example of or include the components of device 605, device 705, a UE 115, IAB node, relay, router, or repeater, as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit, from a first wireless device to a second wireless device in communications with the first wireless device using a first group of antenna elements, an indication of a set of different groups of antenna elements and one or more attributes associated with each group in the set of different groups of antenna elements, the one or more attributes including one or more beam characteristics associated with each group, where each group includes one or more antenna elements from one or more of a plurality of arrays or subarrays of antenna elements, and receive, from the second wireless device in response to the indication of the set of different groups of antenna elements, an antenna group switch indication that indicates communications of the first wireless device are to use a second group of antenna elements from the set of different groups of antenna elements.

The communications manager 910 may as described herein be implemented to realize one or more potential advantages. One implementation may allow the device 605 to provide an indication of preferred antenna groups that may allow for efficient power management, thermal management, or MPE management when using beamformed communications. Further, implementations may allow the device 905 to utilize processing resources more efficiently, among other advantages.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting antenna group selection and indication in millimeter wave bands).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
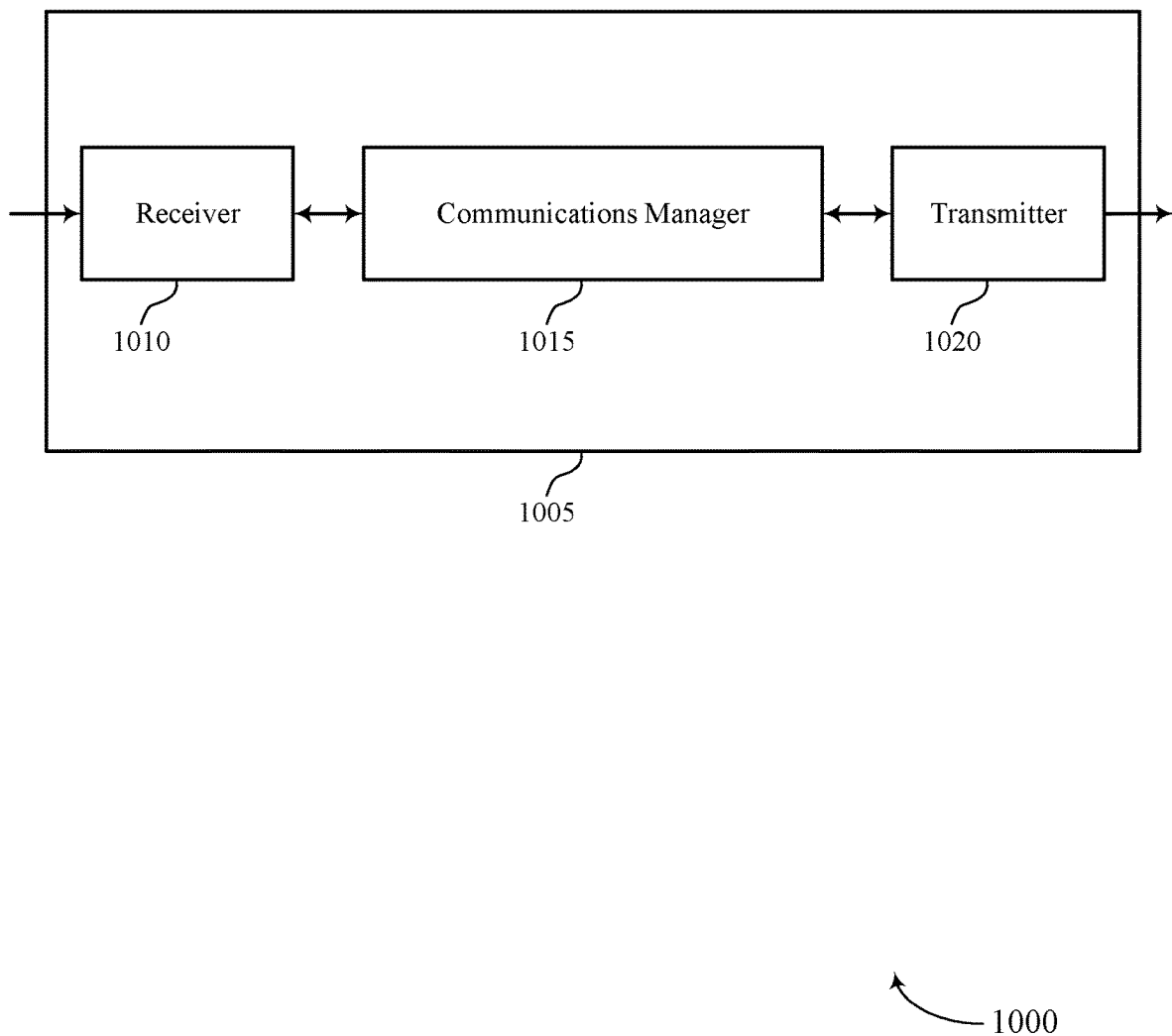
FIGS. 10 and 11 show block diagrams of devices that support antenna group selection and indication in frequency bands in accordance with one or more aspects of the present disclosure.

FIG. 10 shows a block diagram 1000 of a device 1005 that supports antenna group selection and indication in frequency bands in accordance with one or more aspects of the present disclosure. The device 1005 may be an example of aspects of a base station 105, CPE, relay, router, repeater, UE, or IAB node as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to antenna group selection and indication in millimeter wave bands, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, the one or more attributes of each group in the set of different groups of antenna elements including one or more beam characteristics associated with each group, where each group includes one or more antenna elements from one or more of a set of arrays or subarrays of antenna elements, and transmit, to the first wireless device, an antenna group switch indication that indicates communications of the first wireless device are to use the second group of antenna elements. The communications manager 1015 may be an example of aspects of the communications manager 1310 described herein.

The communications manager 1015 may be an example of means for performing various aspects of managing antenna group selection as described herein. The communications manager 1015, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 1015, or its sub-components, may be implemented in code (e.g., as communications management software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field programmable gate array (FPGA) or other programmable logic device.

In some examples, the communication manager 1015 may be configured to perform various operations (e.g., receiving, transmitting) using or otherwise in cooperation with the receiver 1010, the transmitter 1020, or both.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
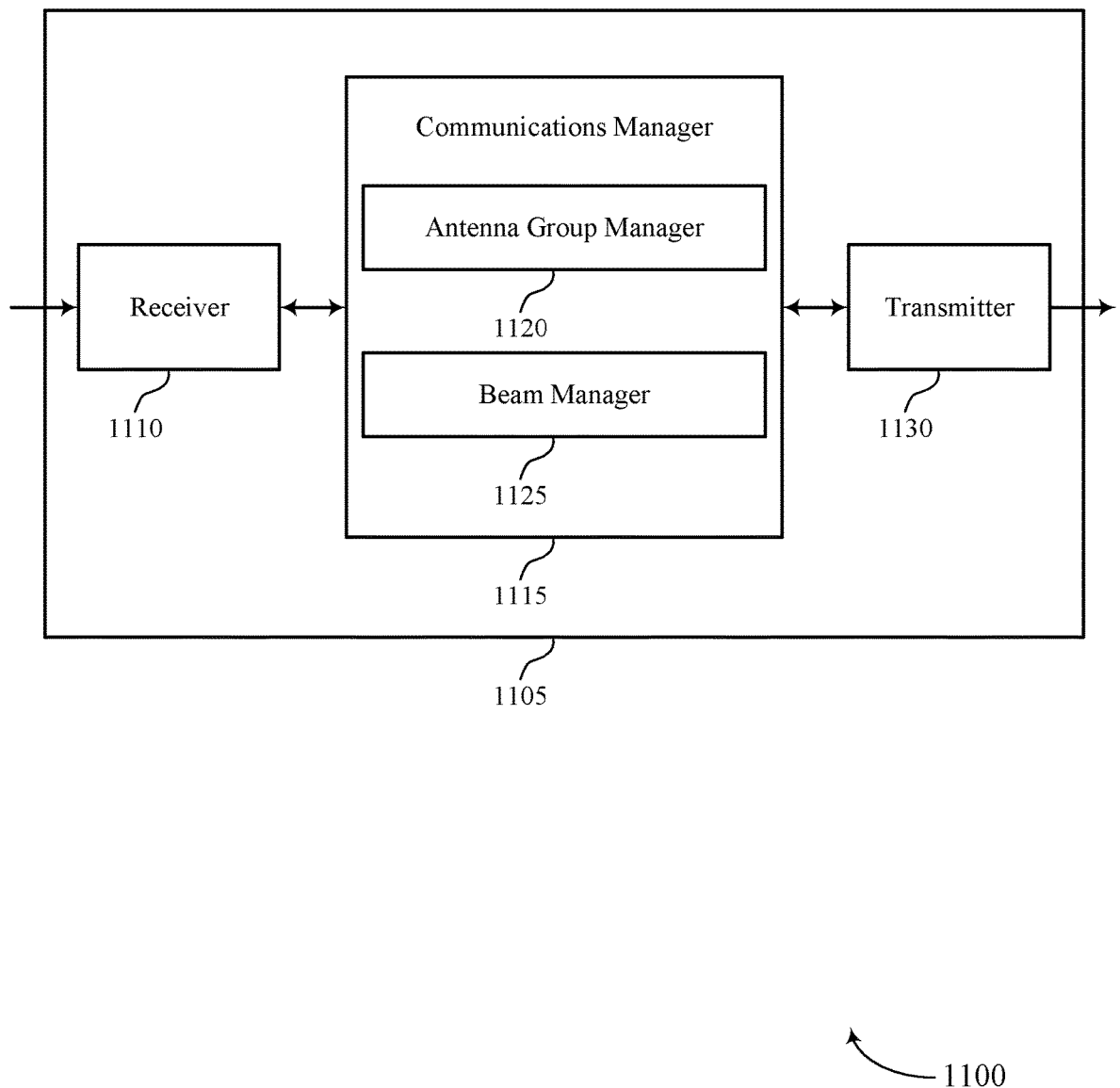

FIG. 11 shows a block diagram 1100 of a device 1105 that supports antenna group selection and indication in frequency bands in accordance with one or more aspects of the present disclosure. The device 1105 may be an example of aspects of a device 1005, or a base station 105, CPE, relay, router, repeater, UE, or IAB node as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to antenna group selection and indication in millimeter wave bands, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an antenna group manager 1120 and a beam manager 1125. The communications manager 1115 may be an example of aspects of the communications manager 1310 described herein.

The antenna group manager 1120 may receive, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, the one or more attributes of each group in the set of different groups of antenna elements including one or more beam characteristics associated with each group, where each group includes one or more antenna elements from one or more of a set of arrays or subarrays of antenna elements.

The beam manager 1125 may transmit, to the first wireless device, an antenna group switch indication that indicates communications of the first wireless device are to use the second group of antenna elements.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
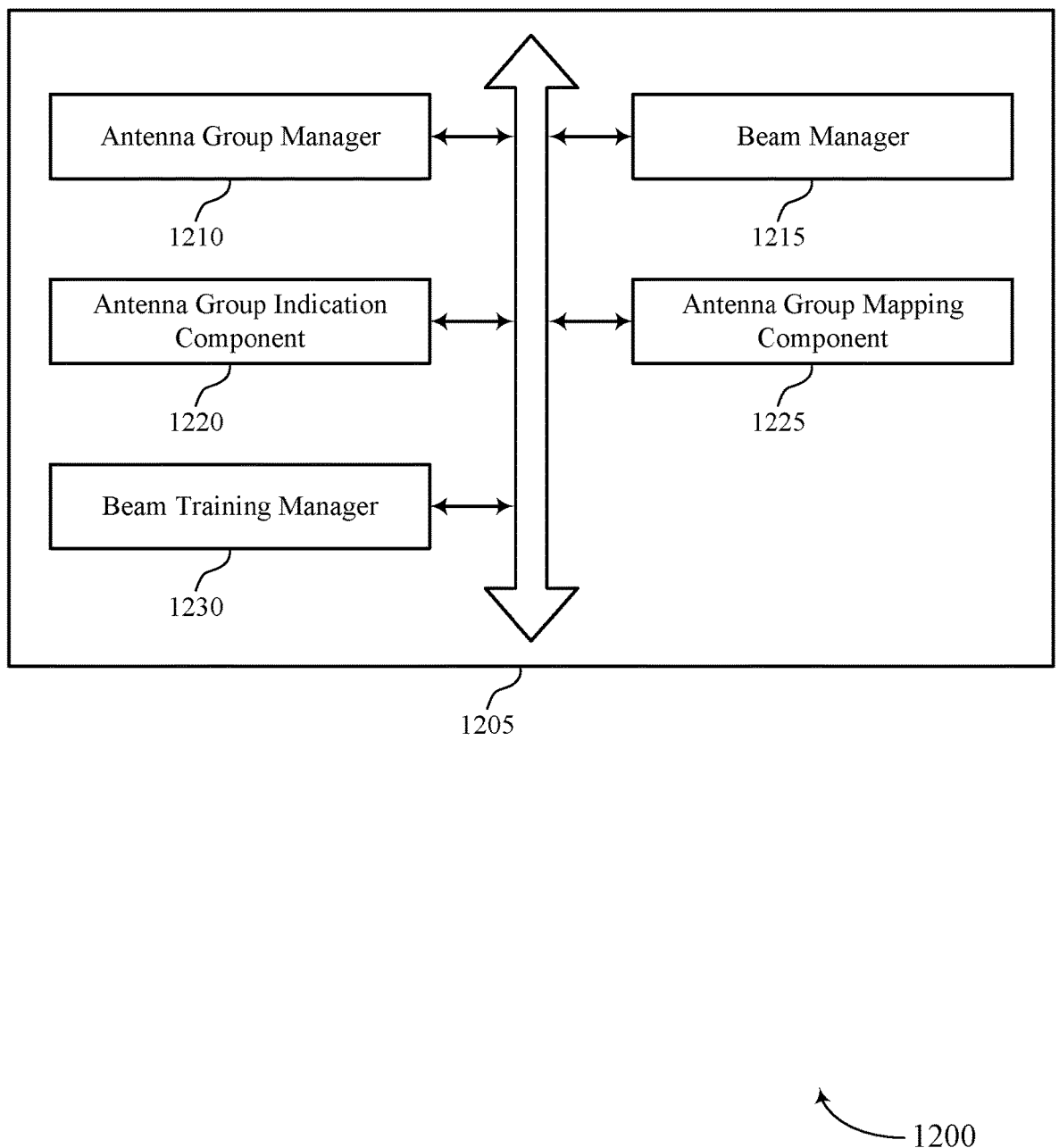
FIG. 12 shows a block diagram of a communications manager that supports antenna group selection and indication in frequency bands in accordance with one or more aspects of the present disclosure.

FIG. 12 shows a block diagram 1200 of a communications manager 1205 that supports antenna group selection and indication in frequency bands in accordance with one or more aspects of the present disclosure. The communications manager 1205 may be an example of aspects of a communications manager 1015, a communications manager 1115, or a communications manager 1310 described herein. The communications manager 1205 may include an antenna group manager 1210, a beam manager 1215, an antenna group indication component 1220, an antenna group mapping component 1225, and a beam training manager 1230. Each of these modules may communicate, directly or indirectly, with one another (e.g., via one or more buses).

The antenna group manager 1210 may receive, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, the one or more attributes of each group in the set of different groups of antenna elements including one or more beam characteristics associated with each group, where each group includes one or more antenna elements from one or more of a set of arrays or subarrays of antenna elements. In some cases, the first wireless device is a UE in a wireless communications system and the second wireless device is a base station in the wireless communications system. In some cases, each of the first wireless device and the second wireless device is one of a base station, a CPE, a relay device, a router, a repeater, or an IAB node.

The beam manager 1215 may transmit, to the first wireless device, an antenna group switch indication that indicates communications of the first wireless device are to use the second group of antenna elements. In some cases, the millimeter wave frequency band includes frequencies that are greater than 52.6 GHz.

The antenna group indication component 1220 may receive an indication of a set of different antenna groups provided by the first wireless device. In some cases, the one or more attributes of each group in the set of different groups of antenna elements further include one or more of a set of antenna indices of the antenna elements in each group, an antenna array size and geometry of each group, or any combinations thereof. In some cases, the one or more beam characteristics of each group in the set of different groups of antenna elements include one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof. In some cases, the indication of the set of different groups of antenna elements and the one or more attributes of the different groups of antenna elements are received from the first wireless device in a control channel transmission, in a MAC-CE, in an RRC communication, in DCI, or any combinations thereof.

The antenna group mapping component 1225 may provide a mapping between one or more indices and antenna elements, antenna groups, antenna modules, or any combinations thereof. In some cases, the indication of each group and the one or more attributes associated with each group is provided as the set of antenna indices that are enabled when the group is selected.

The beam training manager 1230 may transmit, to the first wireless device, a beam training command associated with each group from the set of different groups of antenna elements. In some examples, the beam training manager 1230 may transmit one or more training signals to the first wireless device associated with each group of the set of different groups of antenna elements. In some examples, the beam training manager 1230 may receive, from the first wireless device, a measurement report that indicates one or more preferred training signals of the first wireless device. In some cases, the one or more training signals each correspond to a certain group from the set of different groups of antenna elements.

Figure 13:
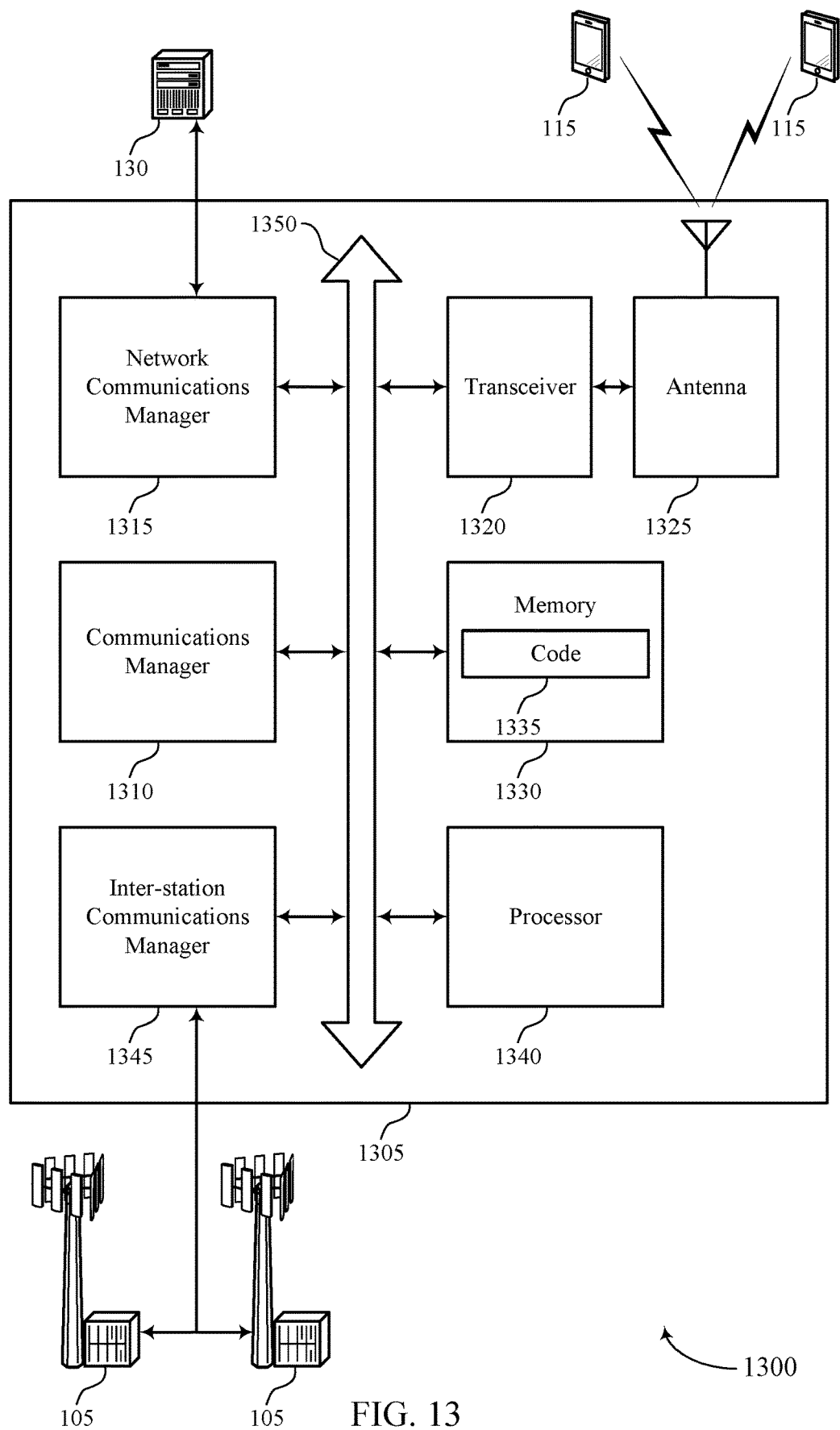
FIG. 13 shows a diagram of a system including a device that supports antenna group selection and indication in frequency bands in accordance with one or more aspects of the present disclosure.

FIG. 13 shows a diagram of a system 1300 including a device 1305 that supports antenna group selection and indication in frequency bands in accordance with one or more aspects of the present disclosure. The device 1305 may be an example of or include the components of device 1005, device 1105, or a base station 105, CPE, relay, router, repeater, UE, or IAB node as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, the one or more attributes of each group in the set of different groups of antenna elements including one or more beam characteristics associated with each group, where each group includes one or more antenna elements from one or more of a set of arrays or subarrays of antenna elements, and transmit, to the first wireless device, an antenna group switch indication that indicates communications of the first wireless device are to use the second group of antenna elements.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting antenna group selection and indication in millimeter wave bands).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
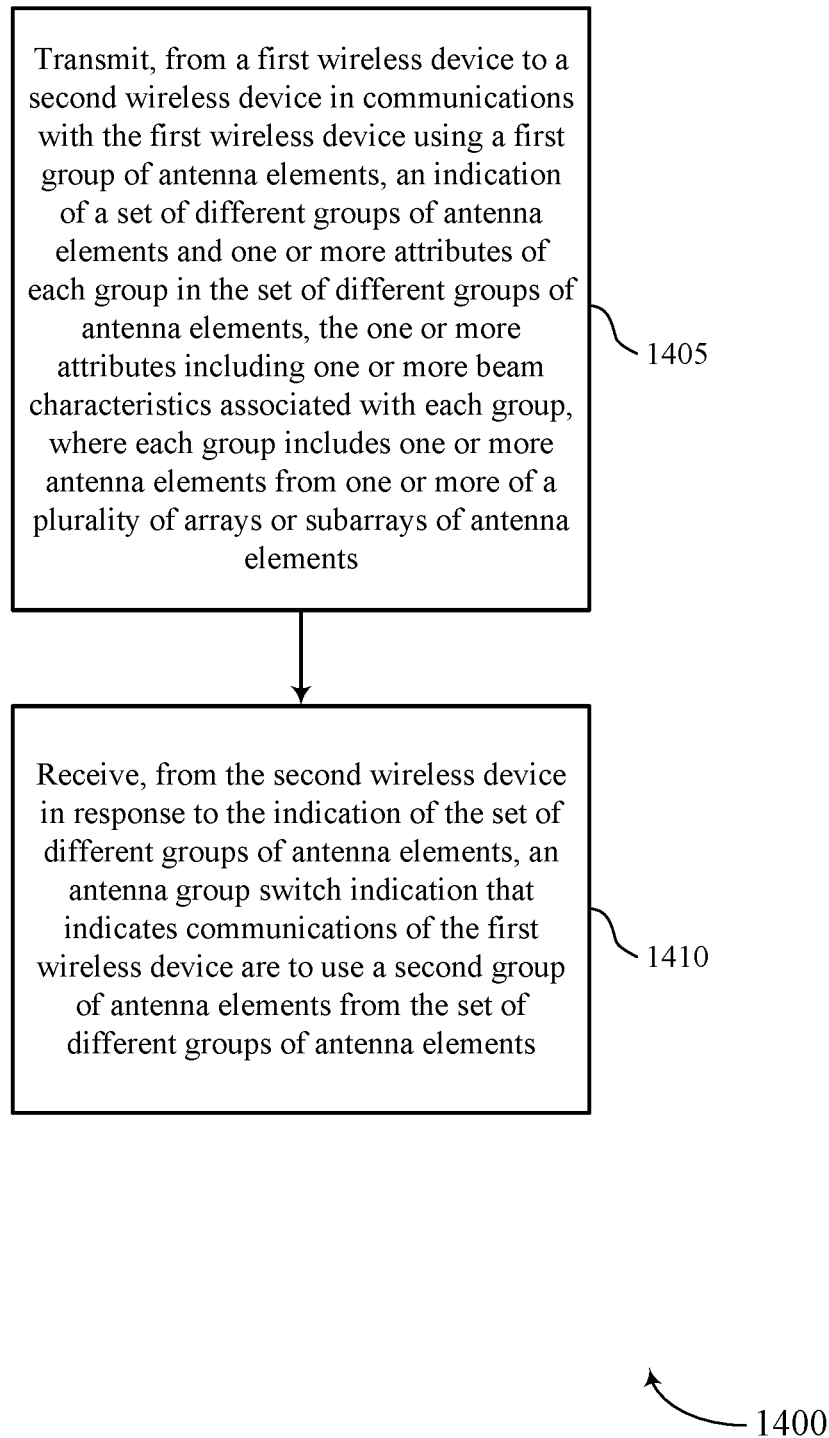
FIGS. 14 through 17 show flowcharts illustrating methods that support antenna group selection and indication in frequency bands in accordance with one or more aspects of the present disclosure.

FIG. 14 shows a flowchart illustrating a method 1400 that supports antenna group selection and indication in frequency bands in accordance with one or more aspects of the present disclosure. The operations of method 1400 may be implemented by a first wireless device or its components as described herein. For example, the operations of method 1400 may be performed by a communications manager as described with reference to FIGS. 6 through 9. In some examples, a wireless device may execute a set of instructions to control the functional elements of the wireless device to perform the functions described herein. Additionally or alternatively, a wireless device may perform aspects of the functions described herein using special-purpose hardware.

At 1405, the first wireless device that is in communications with a second wireless device via a millimeter wave frequency band using a first group of antenna elements may transmit, to the second wireless device, an indication of a set of different groups of antenna elements and one or more attributes associated with each group in the set of different groups of antenna elements, the one or more attributes including one or more beam characteristics associated with each group, where each group includes one or more antenna elements from one or more of a plurality of arrays or subarrays of antenna elements. The operations of 1405 may be performed according to the methods described herein. In some examples, aspects of the operations of 1405 may be performed by an antenna group manager as described with reference to FIGS. 6 through 9.

At 1410, the first wireless device may receive, from the second wireless device in response to the indication of the set of different groups of antenna elements, an antenna group switch indication that indicates communications of the first wireless device are to use a second group of antenna elements from the set of different groups of antenna elements. The operations of 1410 may be performed according to the methods described herein. In some examples, aspects of the operations of 1410 may be performed by a beam manager as described with reference to FIGS. 6 through 9.

Figure 15:
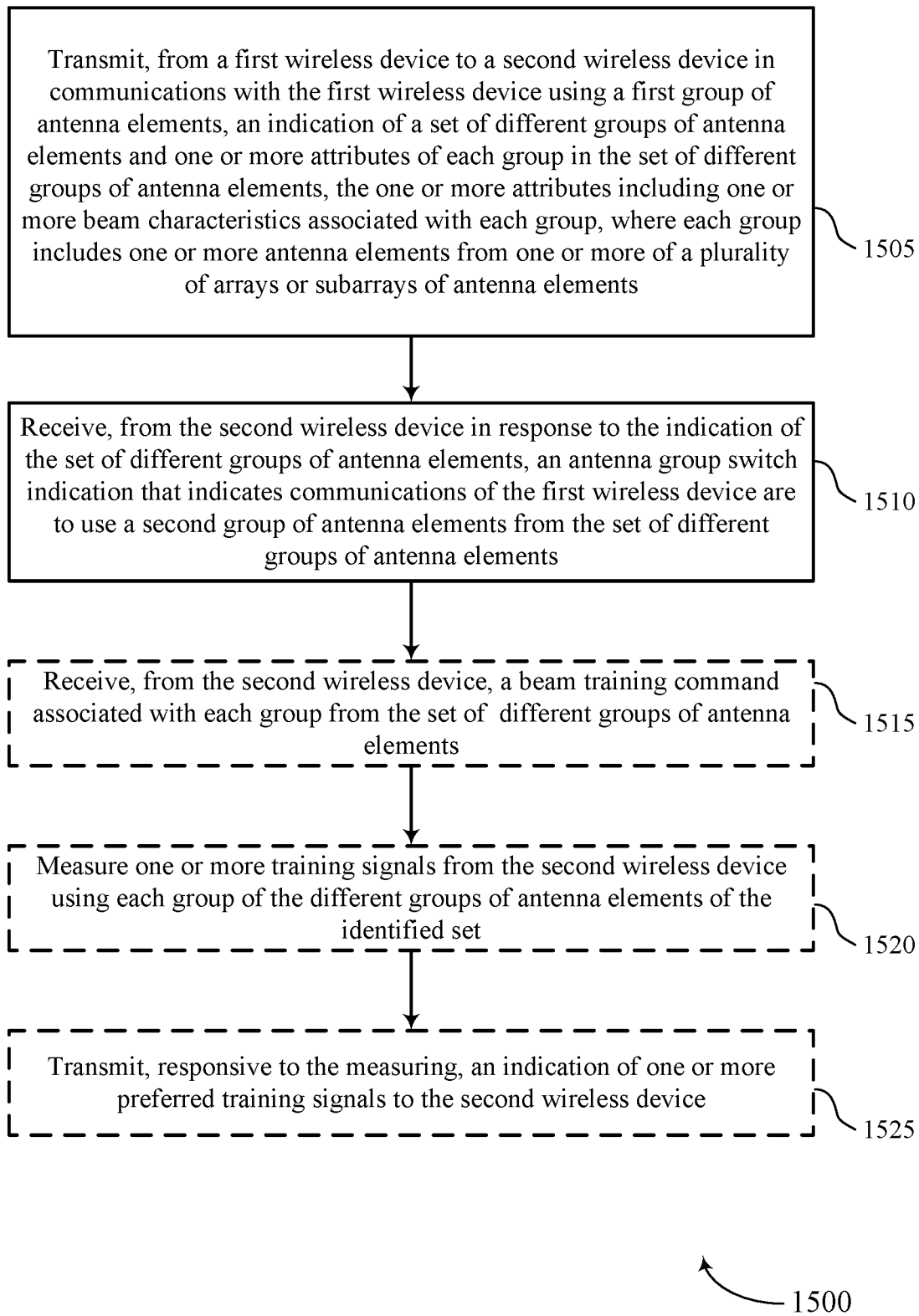

FIG. 15 shows a flowchart illustrating a method 1500 that supports antenna group selection and indication in frequency bands in accordance with one or more aspects of the present disclosure. The operations of method 1500 may be implemented by a first wireless device or its components as described herein. For example, the operations of method 1500 may be performed by a communications manager as described with reference to FIGS. 6 through 9. In some examples, a first wireless device may execute a set of instructions to control the functional elements of the first wireless device to perform the functions described here. Additionally or alternatively, a wireless device may perform aspects of the functions described herein using special-purpose hardware.

At 1505, the first wireless device that is in communications with a second wireless device via a millimeter wave frequency band using a first group of antenna elements may transmit, to the second wireless device, an indication of a set of different groups of antenna elements and one or more attributes associated with each group in the set of different groups of antenna elements, the one or more attributes including one or more beam characteristics associated with each group, where each group includes one or more antenna elements from one or more of a plurality of arrays or subarrays of antenna elements. The operations of 1505 may be performed according to the methods described herein. In some examples, aspects of the operations of 1505 may be performed by an antenna group manager as described with reference to FIGS. 6 through 9.

At 1510, the first wireless device may receive, from the second wireless device in response to the indication of the set of different groups of antenna elements, an antenna group switch indication that indicates communications of the first wireless device are to use a second group of antenna elements from the set of different groups of antenna elements. The operations of 1510 may be performed according to the methods described herein. In some examples, aspects of the operations of 1510 may be performed by a beam manager as described with reference to FIGS. 6 through 9.

At 1515, the first wireless device may receive, from the second wireless device, a beam training command associated with each group from the set of different groups of antenna elements. The operations of 1515 may be performed according to the methods described herein. In some examples, aspects of the operations of 1515 may be performed by a beam training manager as described with reference to FIGS. 6 through 9.

At 1520, the first wireless device may measure one or more training signals from the second wireless device using each group of the set of different groups of antenna elements. The operations of 1520 may be performed according to the methods described herein. In some examples, aspects of the operations of 1520 may be performed by a measurement component as described with reference to FIGS. 6 through 9.

At 1525, the first wireless device may transmit, responsive to the measuring, an indication of one or more preferred training signals to the second wireless device. The operations of 1525 may be performed according to the methods described herein. In some examples, aspects of the operations of 1525 may be performed by a beam training manager as described with reference to FIGS. 6 through 9.

Figure 16:
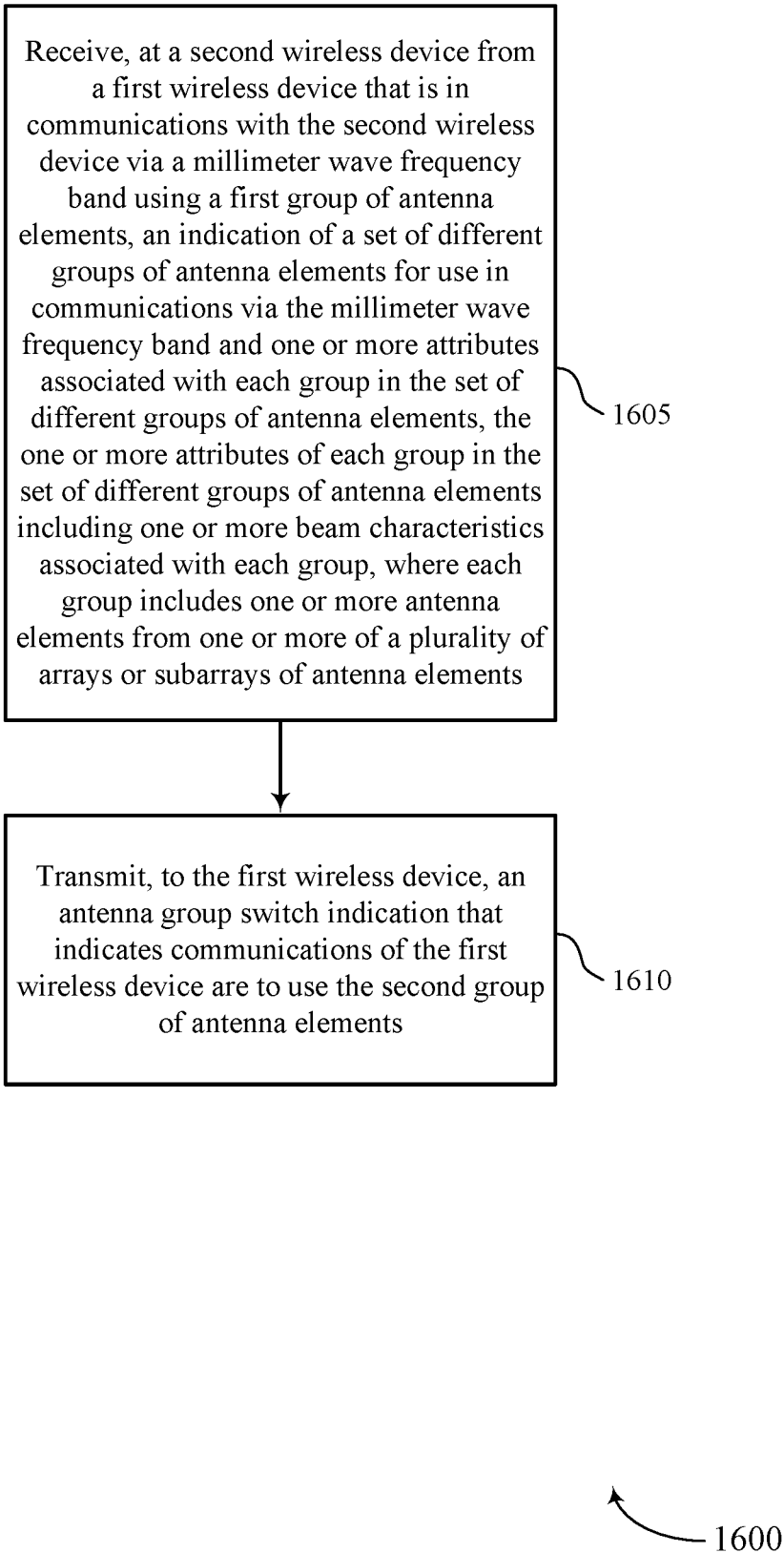

FIG. 16 shows a flowchart illustrating a method 1600 that supports antenna group selection and indication in frequency bands in accordance with one or more aspects of the present disclosure. The operations of method 1600 may be implemented by a second wireless device or its components as described herein. For example, the operations of method 1600 may be performed by a communications manager as described with reference to FIGS. 10 through 13. In some examples, a second wireless device may execute a set of instructions to control the functional elements of the second wireless device to perform the functions described herein. Additionally or alternatively, a wireless device may perform aspects of the functions described herein using special-purpose hardware.

At 1605, the second wireless device may receive, from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, the one or more attributes of each group in the set of different groups of antenna elements including one or more beam characteristics associated with each group, where each group includes one or more antenna elements from one or more of a set of arrays or subarrays of antenna elements. The operations of 1605 may be performed according to the methods described herein. In some examples, aspects of the operations of 1605 may be performed by an antenna group manager as described with reference to FIGS. 10 through 13.

At 1610, the second wireless device may transmit, to the first wireless device, an antenna group switch indication that indicates communications of the first wireless device are to use the second group of antenna elements. The operations of 1610 may be performed according to the methods described herein. In some examples, aspects of the operations of 1610 may be performed by a beam manager as described with reference to FIGS. 10 through 13.

Figure 17:
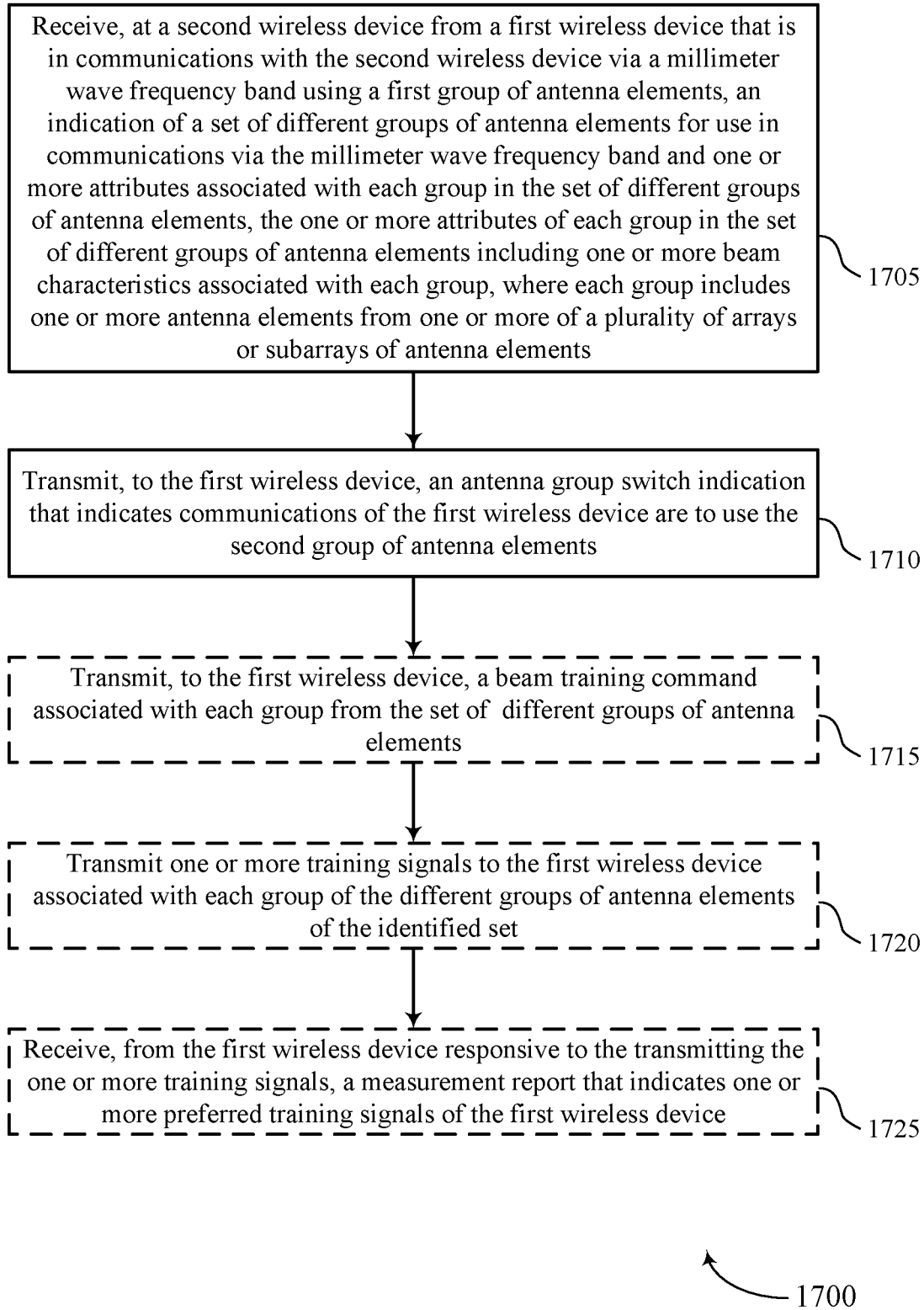

FIG. 17 shows a flowchart illustrating a method 1700 that supports antenna group selection and indication in frequency bands in accordance with aspects of the present disclosure. The operations of method 1700 may be implemented by a second wireless device or its components as described herein. For example, the operations of method 1700 may be performed by a communications manager as described with reference to FIGS. 10 through 13. In some examples, a second wireless device may execute a set of instructions to control the functional elements of the second wireless device to perform the functions described herein. Additionally or alternatively, a wireless device may perform aspects of the functions described herein using special-purpose hardware.

At 1705, the second wireless device may receive, from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, the one or more attributes of each group in the set of different groups of antenna elements including one or more beam characteristics associated with each group, where each group includes one or more antenna elements from one or more of a set of arrays or subarrays of antenna elements. The operations of 1705 may be performed according to the methods described herein. In some examples, aspects of the operations of 1705 may be performed by an antenna group manager as described with reference to FIGS. 10 through 13.

At 1710, the second wireless device may transmit, to the first wireless device, an antenna group switch indication that indicates communications of the first wireless device are to use the second group of antenna elements. The operations of 1710 may be performed according to the methods described herein. In some examples, aspects of the operations of 1710 may be performed by a beam manager as described with reference to FIGS. 10 through 13.

At 1715, the second wireless device may transmit, to the first wireless device, a beam training command associated with each group from the set of different groups of antenna elements. The operations of 1715 may be performed according to the methods described herein. In some examples, aspects of the operations of 1715 may be performed by a beam training manager as described with reference to FIGS. 10 through 13.

At 1720, the second wireless device may transmit one or more training signals to the first wireless device associated with each group of the set of different groups of antenna elements. The operations of 1720 may be performed according to the methods described herein. In some examples, aspects of the operations of 1720 may be performed by a beam training manager as described with reference to FIGS. 10 through 13.

At 1725, the second wireless device may receive, from the first wireless device responsive to the transmitting the one or more training signals, a measurement report that indicates one or more preferred training signals of the first wireless device. The operations of 1725 may be performed according to the methods described herein. In some examples, aspects of the operations of 1725 may be performed by a beam training manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Aspect 1: A method for wireless communications, comprising: transmitting, from a first wireless device to a second wireless device in communications with the first wireless device using a first group of antenna elements, an indication of a set of different groups of antenna elements and one or more attributes associated with each group in the set of different groups of antenna elements, the one or more attributes including one or more beam characteristics associated with each group, where each group includes one or more antenna elements from one or more of a plurality of arrays or subarrays of antenna elements; and receiving, from the second wireless device in response to the indication of the set of different groups of antenna elements, an antenna group switch indication that indicates communications of the first wireless device are to use a second group of antenna elements from the set of different groups of antenna elements.

Aspect 2: The method of aspect 1 where the first wireless device is in communications with the second wireless device via a millimeter frequency wave band.

Aspect 3: The method of any of aspects 1 or 2, where the one or more attributes of each group in the set of different groups of antenna elements further include one or more of a set of antenna indices of the antenna elements in each group, an antenna array size and geometry of each group, or any combinations thereof.

Aspect 4: The method of any of aspects 1 to 3, where the one or more beam characteristics of each group in the set of different groups of antenna elements include one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof.

Aspect 5: The method of any of aspect 3, where the indication of each group and the one or more attributes associated with each group is provided as the set of antenna indices that are enabled when the group is selected.

Aspect 6: The method of any of aspects 1 to 5, where the indication of the set of different groups of antenna elements and the one or more attributes of the different groups of antenna elements are transmitted to the second wireless device in a control channel transmission, in a MAC-CE, in an RRC communication, in DCI or any combinations thereof.

Aspect 7: The method of any of aspects 1 to 6, further comprising: receiving, from the second wireless device, a beam training command associated with each group from the set of different groups of antenna elements; measuring one or more training signals from the second wireless device using each group of the set of different groups of antenna elements; and transmitting, responsive to the measuring, an indication of one or more preferred training signals to the second wireless device.

Aspect 8: The method of aspect 7, where the one or more training signals each correspond to a certain group from the set of different groups of antenna elements.

Aspect 9: The method of any of aspects 1 to 8, where, and the set of different groups of antenna elements is determined based at least in part on a power consumption associated with a carrier frequency of the millimeter wave frequency band, a performance metric associated with the carrier frequency of the millimeter wave frequency band, or any combinations thereof.

Aspect 10: The method of any of aspects 1 to 9, where the first wireless device is a UE in a wireless communications system and the second wireless device is a base station in the wireless communications system.

Aspect 11: The method of any of aspects 1 to 10, where each of the first wireless device and the second wireless device is one of a base station, a CPE, a relay device, a router, a repeater, or an IAB node.

Aspect 12: An apparatus comprising at least one means for performing a method of any of aspects 1 to 11.

Aspect 13: An apparatus for wireless communications comprising a processor; memory coupled to the processor; the processor and memory configured to perform a method of any of aspects 1 to 11.

Aspect 14: A non-transitory computer-readable medium storing code for wireless communications, the code comprising instructions executable by a processor to perform a method of any of aspects 1 to 11.

Aspect 15: A method for wireless communications, comprising: receiving, at a second wireless device from a first wireless device that is in communications with the second wireless device via a millimeter wave frequency band using a first group of antenna elements, an indication of a set of different groups of antenna elements for use in communications via the millimeter wave frequency band and one or more attributes associated with each group in the set of different groups of antenna elements, the one or more attributes of each group in the set of different groups of antenna elements including one or more beam characteristics associated with each group, where each group includes one or more antenna elements from one or more of a plurality of arrays or subarrays of antenna elements; and transmitting, to the first wireless device, an antenna group switch indication that indicates communications of the first wireless device are to use the second group of antenna elements.

Aspect 16: The method of aspect 15, where the one or more attributes of each group in the set of different groups of antenna elements further include one or more of a set of antenna indices of the antenna elements in each group, an antenna array size and geometry of each group, or any combinations thereof.

Aspect 17: The method of any of aspects 15 or 16, where the one or more beam characteristics of each group in the set of different groups of antenna elements include one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof.

Aspect 18: The method of aspect 16, where the indication of each group and the one or more attributes associated with each group is provided as the set of antenna indices that are enabled when the group is selected.

Aspect 19: The method of any of aspects 15 to 18, where the indication of the set of different groups of antenna elements and the one or more attributes of the different groups of antenna elements are received from the first wireless device in a control channel transmission, in a MAC-CE, in an RRC communication, in DCI, or any combinations thereof.

Aspect 20: The method of any of aspects 15 to 19, further comprising: transmitting, to the first wireless device, a beam training command associated with each group from the set of different groups of antenna elements; transmitting one or more training signals to the first wireless device associated with each group of the set of different groups of antenna elements; and receiving, from the first wireless device responsive to the transmitting the one or more training signals, a measurement report that indicates one or more preferred training signals of the first wireless device.

Aspect 21: The method of aspect 20, where the one or more training signals each correspond to a certain group from the set of different groups of antenna elements.

Aspect 22: The method of any of aspects 15 to 21, where the first wireless device is a UE in a wireless communications system and the second wireless device is a base station in the wireless communications system.

Aspect 23: The method of any of aspects 15 to 22, where each of the first wireless device and the second wireless device is one of a base station, a CPE, a relay device, a router, a repeater, or an IAB node.

Aspect 24: An apparatus comprising at least one means for performing a method of any of aspects 15 to 23.

Aspect 25: An apparatus for wireless communications comprising a processor; memory coupled to the processor; the processor and memory configured to perform a method of any of examples 15 to 23.

Aspect 26: A non-transitory computer-readable medium storing code for wireless communications, the code comprising instructions executable by a processor to perform a method of any of aspects 15 to 23.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
    transmitting, from a first wireless device to a second wireless device in communications with the first wireless device using a first group of antenna elements, an indication that indicates a set of different groups of antenna elements and indicates one or more attributes of each group in the set of different groups of antenna elements, the one or more attributes including one or more beam characteristics associated with each group, each group including one or more antenna elements from one or more of a plurality of arrays or subarrays of antenna elements; and
    receiving, from the second wireless device in response to the indication, an antenna group switch indication that indicates communications of the first wireless device are to use a second group of antenna elements from the set of different groups of antenna elements.

2. The method of claim 1, wherein the first wireless device is in communications with the second wireless device via a millimeter frequency wave band.

3. The method of claim 1, wherein the one or more attributes of each group in the set of different groups of antenna elements further include one or more of a set of antenna indices of the antenna elements in each group, an antenna array size and geometry of each group, or any combinations thereof.

4. The method of claim 3, wherein the indication is provided as the set of antenna indices that are enabled when a group is selected.

5. The method of claim 1, wherein the one or more beam characteristics of each group in the set of different groups of antenna elements include one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof.

6. The method of claim 1, wherein the indication is transmitted to the second wireless device in a control channel transmission, in a medium access control element (MAC-CE), in a radio resource control (RRC) communication, in downlink control information (DCI), or any combinations thereof.

7. The method of claim 1, further comprising:
    receiving, from the second wireless device, a beam training command associated with each group from the set of different groups of antenna elements;
    measuring one or more training signals from the second wireless device using each group of the set of different groups of antenna elements; and
    transmitting, responsive to the measuring, an indication of one or more preferred training signals to the second wireless device.

8. The method of claim 7, wherein the one or more training signals each correspond to a certain group from the set of different groups of antenna elements.

9. The method of claim 1, wherein:
    the set of different groups of antenna elements is determined based at least in part on a power consumption associated with a carrier frequency of a millimeter wave frequency band, a performance metric associated with the carrier frequency of the millimeter wave frequency band, or any combinations thereof.

10. The method of claim 1, wherein the first wireless device is a user equipment (UE) in a wireless communications system and the second wireless device is a network device in the wireless communications system.

11. The method of claim 1, wherein each of the first wireless device and the second wireless device is one of a network device, a customer premise equipment (CPE), a relay device, a router, a repeater, or an integrated access and backhaul (IAB) node.

12. A method for wireless communications, comprising:
    receiving, at a second wireless device from a first wireless device that is in communications with the second wireless device via a millimeter wave frequency band using a first group of antenna elements, an indication that indicates a set of different groups of antenna elements for use in communications via the millimeter wave frequency band and indicates one or more attributes of each group in the set of different groups of antenna elements, the one or more attributes of each group in the set of different groups of antenna elements including one or more beam characteristics associated with each group, each group including one or more antenna elements from one or more of a plurality of arrays or subarrays of antenna elements; and
    transmitting, to the first wireless device, an antenna group switch indication that indicates communications of the first wireless device are to use a second group of antenna elements.

13. The method of claim 12, wherein the one or more attributes of each group in the set of different groups of antenna elements further include one or more of a set of antenna indices of the antenna elements in each group, an antenna array size and geometry of each group, or any combinations thereof.

14. The method of claim 13, wherein the indication is provided as the set of antenna indices that are enabled when a group is selected.

15. The method of claim 12, wherein the one or more beam characteristics of each group in the set of different groups of antenna elements include one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof.

16. The method of claim 12, wherein the indication is received from the first wireless device in a control channel transmission, in a medium access control element (MAC-CE), in a radio resource control (RRC) communication, in downlink control information (DCI), or any combinations thereof.

17. The method of claim 12, further comprising:
transmitting, to the first wireless device, a beam training command associated with each group from the set of different groups of antenna elements;
transmitting one or more training signals to the first wireless device associated with each group of the set of different groups of antenna elements; and
receiving, from the first wireless device responsive to the transmitting the one or more training signals, a measurement report that indicates one or more preferred training signals of the first wireless device.

18. The method of claim 17, wherein the one or more training signals each correspond to a certain group from the set of different groups of antenna elements.

19. The method of claim 12, wherein the first wireless device is a user equipment (UE) in a wireless communications system and the second wireless device is a network device in the wireless communications system.

20. The method of claim 12, wherein each of the first wireless device and the second wireless device is one of a network device, a customer premise equipment (CPE), a relay device, a router, a repeater, or an integrated access and backhaul (IAB) node.

21. An apparatus for wireless communications at a first wireless device, comprising:
one or more memories; and
one or more processors coupled with the one or more memories and configured to cause the first wireless device to:
transmit, from the first wireless device to a second wireless device in communications with the first wireless device via a first group of antenna elements, an indication that indicates a set of different groups of antenna elements and indicates one or more attributes of each group in the set of different groups of antenna elements, the one or more attributes including one or more beam characteristics associated with each group, each group including one or more antenna elements from one or more of a plurality of arrays or subarrays of antenna elements; and
receive, from the second wireless device in response to the indication, a beam and antenna group switch indication that indicates communications of the first wireless device are to use a second group of antenna elements from the set of different groups of antenna elements.

22. The apparatus of claim 21, wherein the one or more attributes of each group in the set of different groups of antenna elements further include one or more of a set of antenna indices of the antenna elements in each group, an antenna array size and geometry of each group, or any combinations thereof.

23. The apparatus of claim 22, wherein the indication is provided as the set of antenna indices that are enabled when a group is selected.

24. The apparatus of claim 21, wherein the one or more beam characteristics of each group in the set of different groups of antenna elements include one or more of a narrowest beamwidth possible in azimuth and/or elevation dimensions from each group, peak array gains possible in azimuth and/or elevation from each group, side lobes observed in azimuth and/or elevation and associated with peak array gains from each group, or any combinations thereof.

25. The apparatus of claim 21, wherein the indication is transmitted to the second wireless device in a control channel transmission, in a medium access control control element (MAC-CE), in a radio resource control (RRC) communication, in downlink control information (DCI), or any combinations thereof.

26. The apparatus of claim 21, wherein the one or more processors are further configured to cause the first wireless device to:
receive, from the second wireless device, a beam training command associated with each group from the set of different groups of antenna elements;
measure one or more training signals from the second wireless device via use of each group of the set of different groups of antenna elements; and
transmit, responsive to the measurement of the one or more training signals, an indication of one or more preferred training signals to the second wireless device.

27. The apparatus of claim 21, further comprising: one or more of an antenna array or an antenna subarray, wherein the antenna array or the antenna subarray comprises the first group of antenna elements.

28. An apparatus for wireless communications at a second wireless device, comprising:
one or more memories; and
one or more processors coupled with the one or more memories and configured to cause the second wireless device to:
receive, at the second wireless device from a first wireless device that is in communications with the second wireless device via a millimeter wave frequency band by use of a first group of antenna elements, an indication that indicates a set of different groups of antenna elements for use in communications via the millimeter wave frequency band and indicates one or more attributes of each group in the set of different groups of antenna elements, the one or more attributes of each group in the set of different groups of antenna elements including one or more beam characteristics associated with each group, each group including one or more antenna elements from one or more of a plurality of arrays of antenna elements; and
transmit, to the first wireless device, a beam and antenna group switch indication that indicates communications of the first wireless device are to use a second group of antenna elements.

29. The apparatus of claim 28, wherein the one or more attributes of each group in the set of different groups of antenna elements further include one or more of a set of antenna indices of the antenna elements in each group, an antenna array size and geometry of each group, or any combinations thereof.

30. The apparatus of claim 28, further comprising:
at least one antenna, wherein the one or more processors and the at least one antenna are further configured to cause the second wireless device to:
transmit, to the first wireless device, a beam training command associated with each group from the set of different groups of antenna elements;
transmit one or more training signals to the first wireless device associated with each group of the set of different groups of antenna elements; and
receive, from the first wireless device in response to transmission of the one or more training signals, a measurement report that indicates one or more preferred training signals of the first wireless device.

31. A non-transitory computer-readable medium storing code for wireless communications at a first wireless device, the code comprising instructions executable by one or more processors to cause the first wireless device to:
transmit, from the first wireless device to a second wireless device in communications with the first wireless device using a first group of antenna elements, an indication that indicates a set of different groups of antenna elements and indicates one or more attributes of each group in the set of different groups of antenna elements, the one or more attributes including one or more beam characteristics associated with each group, and each group including one or more antenna elements from one or more of a plurality of arrays or subarrays of antenna elements; and
receive, from the second wireless device in response to the indication, an antenna group switch indication that indicates communications of the first wireless device are to use a second group of antenna elements from the set of different groups of antenna elements.

32. The non-transitory computer-readable medium of claim 31, wherein the first wireless device is in communications with the second wireless device via a millimeter frequency wave band.

33. The non-transitory computer-readable medium of claim 31, wherein the one or more attributes of each group in the set of different groups of antenna elements further include one or more of a set of antenna indices of the antenna elements in each group, an antenna array size and geometry of each group, or any combinations thereof.

34. A non-transitory computer-readable medium storing code for wireless communications at a second device, the code comprising instructions executable by one or more processors to cause the second wireless device to:
receive, at the second wireless device from a first wireless device that is in communications with the second wireless device via a millimeter wave frequency band using a first group of antenna elements, an indication that indicates a set of different groups of antenna elements for use in communications via the millimeter wave frequency band and indicates one or more attributes of each group in the set of different groups of antenna elements, the one or more attributes of each group in the set of different groups of antenna elements including one or more beam characteristics associated with each group, and each group including one or more antenna elements from one or more of a plurality of arrays or subarrays of antenna elements; and
transmit, to the first wireless device, an antenna group switch indication that indicates communications of the first wireless device are to use a second group of antenna elements.

35. The non-transitory computer-readable medium of claim 34, wherein the one or more attributes of each group in the set of different groups of antenna elements further include one or more of a set of antenna indices of the antenna elements in each group, an antenna array size and geometry of each group, or any combinations thereof.

36. The non-transitory computer-readable medium of claim 35, wherein the indication is provided as the set of antenna indices that are enabled when a group is selected.

* * * * *